(12) United States Patent
Liu et al.

(10) Patent No.: US 10,515,296 B2
(45) Date of Patent: Dec. 24, 2019

(54) FONT RECOGNITION BY DYNAMICALLY WEIGHTING MULTIPLE DEEP LEARNING NEURAL NETWORKS

(71) Applicant: Adobe Inc., San Jose, CA (US)

(72) Inventors: Yang Liu, Cambridge (GB); Zhaowen Wang, San Jose, CA (US); I-Ming Pao, Palo Alto, CA (US); Hailin Jin, San Jose, CA (US)

(73) Assignee: Adobe Inc., San Jose, CA (US)

(*) Notice: Subject to any disclaimer, the term of this patent is extended or adjusted under 35 U.S.C. 154(b) by 234 days.

(21) Appl. No.: 15/812,548

(22) Filed: Nov. 14, 2017

(65) Prior Publication Data

US 2019/0147304 A1    May 16, 2019

(51) Int. Cl.
| | |
|---|---|
| G06K 9/62 | (2006.01) |
| G06K 9/68 | (2006.01) |
| G06N 5/04 | (2006.01) |
| G06N 3/08 | (2006.01) |

(52) U.S. Cl.
CPC ........... *G06K 9/6828* (2013.01); *G06K 9/628* (2013.01); *G06K 9/6227* (2013.01); *G06K 9/6257* (2013.01); *G06K 9/6262* (2013.01); *G06K 9/6277* (2013.01); *G06N 3/08* (2013.01); *G06N 5/046* (2013.01)

(58) Field of Classification Search
CPC .. G06K 9/6227; G06K 9/6257; G06K 9/6262; G06K 9/6277; G06K 9/628; G06K 9/6828; G06N 3/0454; G06N 3/08; G06N 3/084; G06N 5/046
See application file for complete search history.

(56) References Cited

U.S. PATENT DOCUMENTS

| | | | | |
|---|---|---|---|---|
| 9,501,721 B2* | 11/2016 | Yang | ........ | G06K 9/6828 |
| 2017/0098141 A1* | 4/2017 | Wang | ........ | G06K 9/6828 |
| 2019/0130232 A1* | 5/2019 | Kaasila | ........ | G06N 20/00 |

OTHER PUBLICATIONS

Dietterich, Thomas G. ("Ensemble methods in machine learning." International workshop on multiple classifier systems. Springer Berlin Heidelberg, 2000; pp. 1-15) (Year: 2000).*

(Continued)

*Primary Examiner* — Amara Abdi
(74) *Attorney, Agent, or Firm* — Keller Jolley Preece

(57) ABSTRACT

The present disclosure relates to a font recognition system that employs a multi-task learning framework and training to improve font classification and remove negative side effects caused by intra-class variances of glyph content. For example, in one or more embodiments, the font recognition system trains a hybrid font recognition neural network that includes two or more font recognition neural networks and a weight prediction neural network. The hybrid font recognition neural network determines and generates classification weights based on which font recognition neural network within the hybrid font recognition neural network is best suited to classify the font in an input text image. By employing a hybrid trained font classification neural network, the font recognition system can improve overall font recognition as well as remove the negative side effects from diverse glyph content.

20 Claims, 12 Drawing Sheets

(56) References Cited

OTHER PUBLICATIONS

Zhang et al ("Multi-font printed Chinese Character Recognition using Multi-pooling conventional neural network", 2015 13th international conference on document analysis and recognition, (ICDAR), IEEE, 2015) (Year: 2015).*

Dietterich, Thomas G. "Ensemble methods in machine learning." International workshop on multiple classifier systems. Springer Berlin Heidelberg, 2000; pp. 1-15.

Schmidhuber, Jürgen. "Deep learning in neural networks: An overview." Neural networks 61 (2015): pp. 85-117.

* cited by examiner

| Fonts 302 | First Font Probability Vector Values 304 | Second Font Probability Vector Values 306 | First Font Classification Probability Value 308 | Second Font Classification Probability Value 310 | Hybrid Font Probability Vector Values 312 |
|---|---|---|---|---|---|
| Font A | 0.95 | 0.40 | 0.80 | 0.20 | 0.84 |
| Font B | 0.05 | 0.40 | 0.80 | 0.20 | 0.12 |
| Font C | 0.00 | 0.20 | 0.80 | 0.20 | 0.04 |

*Fig. 3*

FONT RECOGNITION BY DYNAMICALLY WEIGHTING MULTIPLE DEEP LEARNING NEURAL NETWORKS

BACKGROUND

Recent years have seen a rapid proliferation in the use of computing devices in the area of digital typography with respect to creating and editing electronic documents. Indeed, it is now commonplace for individuals and businesses to use digital typography to create customized webpages, e-mails, magazines, marketing materials, and other electronic documents utilizing desktop and laptop computers, mobile devices, tablets, smartphones, or other computing devices.

Digital typography includes the use of digital fonts. Recent years have also seen an increase in the type and variety of digital fonts utilized in electronic documents. For example, an electronic document can use digital fonts selected from a collection of thousands of digital fonts. Further, individuals can effortlessly find, access, and install additional digital fonts on a computing device to be used for creating electronic documents.

A major challenge that has arisen with the increase in the number of digital fonts is the capability to correctly detect and recognize digital fonts. For example, an individual sees a font in a document or image and desires to use the same font in an electronic document. As such, the font in the document or image must be correctly identified before the user can use it as a digital font. In general, the ability to detect and recognize digital fonts can greatly enhance an individual's experience when creating and editing electronic documents.

While some recent font classification systems have been developed to recognize fonts using machine-learning algorithms, these recent font classification systems still struggle in the area of intra-class variances within a class of digital fonts (e.g., variations between glyphs of the same font). While this problem exists with respect to glyphs (e.g., unique symbols that make up words) that use the Roman alphabet, the magnitude of the problem increases with other languages. To demonstrate, the Roman alphabet uses 26 different glyphs while Japanese writing includes over 50,000 glyphs. Other languages also include thousands of glyphs.

As the number of glyphs increase, such as in the case of Japanese fonts, the number of intra-class variances within the glyph content likewise increases. In many cases, due to the number of glyphs, recent font classification systems do not learn every glyph during training, which then leads to misclassification and inaccurate results. As another issue, particularly with Japanese fonts, the visual difference between different Japanese writing types (e.g., logographic kanji and syllabic kana) is significant, and the large difference between the two glyph styles further magnifies the intra-class variation issue in Japanese font recognition. Further, because of the visual difference between different Japanese writing types, recent font classification systems require significantly more training samples to correctly recognize and classify Japanese fonts. In sum, even recent font classification systems fail to provide the level of generalization and accuracy needed to correctly identify Japanese fonts.

Furthermore, recent font classification systems that employ machine-learning algorithms to classify fonts require large amounts of memory and computational requirements. In particular, recent font classification systems require additional memory, processing resources, and time to converge a neural network to identify accurate font feature vectors and font probability vectors. Also, due to the additional requirements, recent font classification systems are often unstable. Further, because of these requirements, client devices, particularly mobile ones, cannot execute these neural networks.

These and other problems exist with regards to detecting and classifying digital fonts, especially non-Roman fonts (e.g., Japanese fonts, Chinese fonts, et al.), using existing systems and methods.

SUMMARY

Embodiments of the present disclosure provide benefits and/or solve one or more of the foregoing or other problems in the art with systems, computer media, and methods for effectively recognizing digital fonts (or simply "fonts") by dynamically weighting multiple deep learning neural networks. For example, the disclosed systems, computer media, and methods first train two or more font recognition neural networks, then train a weight prediction neural network that dynamically predicts the probability that each font recognition neural network is best suited to classify a given text image. The disclosed systems, computer media, and methods then combine the weighted predictions to identify fonts. Overall, the systems, computer media, and methods disclosed herein improve font recognition accuracy by reducing the negative side effects caused by intra-class variances of glyph content, and in particular, glyphs that are not well represented or seen in training.

More particularly, the disclosed systems train a first font recognition neural network to classify fonts using a first set of training text images that includes a first glyph type. In addition, the disclosed systems train a second font recognition neural network to classify fonts using a second set of training text images that includes a second glyph type. In some instances, the first set of training text images include multiple glyph types (e.g., both Japanese kanji and kana glyphs). The disclosed systems further train a weight prediction neural network, in connection with the first and second font recognition neural networks, that predicts a first font classification probability that the first font recognition neural network will output a better font classification for a training text image than will the second font recognition neural network.

Once trained, the hybrid font recognition neural network (e.g., the trained first font recognition neural network, second font recognition neural network, and weight prediction neural network) can receive an input text image that includes an input font (e.g., either Japanese kana or kanji glyphs). In particular, based on the input, the disclosed systems determine a first font probability vector using the font recognition neural network and a second font probability vector using the second font recognition neural network. In addition, the disclosed systems employ the weight prediction neural network to determine a first font classification probability, which indicates the probability that the first trained font recognition neural network will output a better font classification for the input font than the second trained font recognition neural network. Using the first font probability vector weighted by the first font classification probability and the second font probability vector weighted by a second font classification probability, the disclosed systems generate a hybrid font probability vector, which indicates the input digital font from a set of known fonts.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 3. illustrates a table for dynamically generating a hybrid font probability vector using the hybrid font recognition neural network in accordance with one or more embodiments.

DETAILED DESCRIPTION

Figure 1:
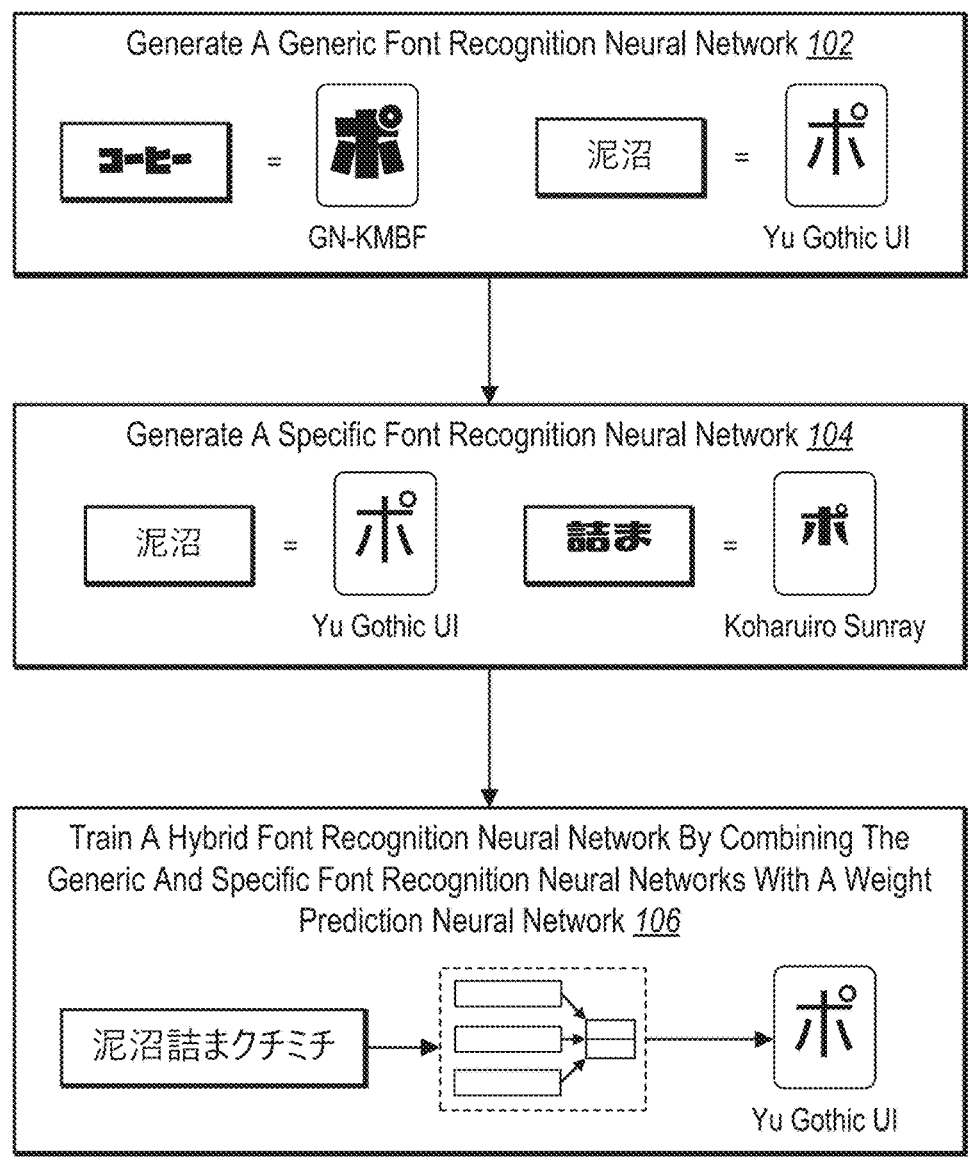
FIG. 1 illustrates a diagram of a general process for training a hybrid font recognition neural network using a weight prediction neural network in accordance with one or more embodiments.

This disclosure describes one or more embodiments of a font recognition system that employs a multi-task learning framework to improve font classification and remove negative side effects caused by intra-class variances of glyph content. In particular, the font recognition system trains a hybrid font recognition neural network using a weight prediction neural network to improve overall font recognition on fonts with glyphs that have complex intra-class variations (e.g., Japanese fonts having a mixture of kana and kanji variations). In some embodiments, the font recognition system includes three components including a first component for recognizing generic glyphs to serve as an initialization of the system, a second component for recognizing a specific glyph type, and a third component for predicting weights corresponding to the outputs of the first and second components. By weighting and combining the outputs of the first and second components to form a final font prediction, the font recognition system improves font recognition capabilities.

To illustrate, in one or more embodiments, the font recognition system trains a first font recognition neural network to classify fonts using a first set of training text images that includes a first glyph type (e.g., Japanese kana glyphs). In addition, the font recognition system trains a second font recognition neural network to classify fonts using a second set of training text images that includes a second glyph type (e.g., Japanese kanji glyphs). In additional embodiments, the first set of training text images includes multiple glyph types (e.g., both Japanese kanji and kana glyphs) while the second set of training text images includes only the second glyph type. In these additional embodiments, the first font recognition neural network is a more generic recognition network and the second font recognition neural network is a specific or specialized recognition network.

Upon training the first and second font recognition neural networks, the font recognition system generates a hybrid font recognition neural network that includes a weight prediction neural network. In particular, in one or more embodiments, the font recognition system trains the weight prediction neural network based on the first and second font recognition neural networks to predict a first font classification probability that the first font recognition neural network will output a better font classification for a training text image than will the second font recognition neural network. In some embodiments, the weight prediction neural network also predicts a second font classification probability that the second font recognition neural network will output a better font classification for the training text image than will the first font recognition neural network.

Specifically, in one or more embodiments, when training the weight prediction neural network within the hybrid font recognition neural network, the font recognition system provides a training text image to the first font recognition neural network, the second font recognition neural network, and the weight prediction neural network. The first and second font recognition neural networks each output a font probability vector that classifies the font and corresponds to a number of known fonts. The weight prediction neural network outputs a two-dimension prediction vector that indicates two font classification probabilities for the first and second font recognition neural networks. The font recognition system weights the first font probability vector from the first font recognition neural network by the first font classification probability. The font recognition system weights the second font probability vector by the second classification probability. The font recognition system then generates a hybrid font probability by combining the weighted first and second font classification probability vectors.

In addition, in some embodiments, the font recognition system can use back propagation feedback and end-to-end learning to train the hybrid font recognition neural network by providing font classification error loss back to the neural networks. For instance, the font recognition system provides the error loss at a small learning rate to finely train (i.e., fine-tuning) the font recognition neural networks because the font recognition neural networks have previously been trained. However, because the weight prediction neural network is being trained from scratch, the font recognition system provides the error loss at a large learning rate to the weight prediction neural network to enable the weight prediction neural network to make accurate font classification predictions with respect to the font recognition neural networks for given text images.

In some embodiments, the hybrid font recognition neural network includes more than two font recognition neural networks. For example, the hybrid font recognition neural network can include any number of font recognition neural networks coupled to a weight prediction neural network, which proportionally divides font classification probability predictions among the font recognition neural networks. Also, regardless of the number of included font recognition neural networks, the hybrid font recognition neural network trains using a single hybrid font probability vector and a single font classification loss model.

The font recognition system also uses the trained hybrid font recognition neural network to identify fonts in input text images. For example, in various embodiments, the font recognition system receives an input text image that includes an input font. The font recognition system provides the input text image to the first trained font recognition neural network, the second trained font recognition neural network, and the trained weight prediction neural network. The first trained font recognition neural network outputs a first font probability vector, the second trained font recognition neural network outputs a second font probability vector, and the trained weight prediction neural network outputs at a first font classification probability and a second font classification probability. As mentioned, the first font classification probability indicates the probability that the first trained font recognition neural network will output a better font classification for the input font than the second trained font recognition neural network, and vice versa with the second font classification probability.

In additional embodiments, the font recognition system generates a hybrid font probability vector for the input font based on the first font probability vector, the first font classification probability, the second font probability vector, and the second font classification probability. In some embodiments, the font recognition system determines the second font classification probability by subtraction of the first font classification probability from one.

Using the hybrid font probability vector, the font recognition system identifies the input digital font from known fonts. Specifically, in various embodiments, the hybrid font probability vector indicates a matching probability between the input font and each font in a set of known fonts, such that the font recognition system identifies the input font as the known font having the highest matching probability within the font probability vector. The font recognition system can identify known fonts with the next highest matching probabilities as similar fonts (e.g., the top five matching fonts).

As previously mentioned, the font recognition system provides numerous advantages and benefits over conventional systems and methods. As an example, the font recognition system trains and identifies fonts that traditionally suffer from negative side effects caused by intra-class variances of glyph content (e.g., Japanese fonts having kanji and kana). In particular, by employing multiple distinct font recognition neural networks (that initially train on different sets of text images having different glyph types), and the weight prediction neural network, the font recognition system trains a hybrid font recognition neural network to remove the side effects of intra-class variances of glyph content. Specifically, the font recognition system is able to remove the side effects of intra-class variances of glyph content by initially training a generic font recognition network and a specific font recognition network, then combining the generic and specific font recognition networks using the weight prediction neural network.

Further, as another example, in many embodiments, the font recognition system provides increased flexibility over known systems by accurately identifying text in input text images not included in the training font set. In particular, as a result of removing the negative side effects caused by glyph content through employing the weight prediction neural network, the trained hybrid font recognition neural network becomes more generalized, which enables the font recognition system to accurately identify the font of glyphs unseen in the training stage. This is particularly advantageous when working with languages that have a large variety and number of possible glyphs (e.g., over 50,000 glyphs in the Japanese language) as the training font set may only include a small percentage (e.g., ~1%) of possible glyphs.

As further described below, the font recognition system outperforms state-of-the-art font classifications systems in head-to-head evaluations with respect to accurately identifying fonts from text images. For instance, the font recognition outperformed state-of-the-art font classifications systems with respect to overall accuracy in recognizing fonts from a first set of text images that included both Japanese kanji and kana glyph as well a second test set of text images that included only kanji glyphs. Indeed, the font recognition system provides a more generalized ability to recognize fonts as well as produce accurate results. Additional results of testing and evaluating the font recognition system are described below in connection with FIGS. 7A and 7B.

In addition, in contrast to many font classification systems, the font recognition system disclosed herein can train the hybrid font recognition neural network without the need for additional information or labels. In particular, the font recognition system uses the outputs of the first and second font recognition neural networks in connection with the font classification loss model to dynamically and automatically learn weight predictions regarding which font recognition neural network will output a better font classification for a given text image, without the need of employing a voting or averaging strategy.

As a further benefit, the font recognition system reduces memory needs and computational requirements over known systems. For example, for a state-of-the-art font classification system to achieve similar results as the font recognition system disclosed herein, the system would require additional training iterations, a significantly larger amount of training font data, and/or memory storage. Additionally, the state-of-the-art font classification system would also require additional time to train a neural network that achieves comparable results as the font recognition system disclosed herein. Further, even with the increased time and resources, the state-of-the-art font classifications system would not produce a font recognition neural network that is as robust and stable as one or more embodiments described herein.

Additional advantages and benefits of the font recognition system will become apparent in view of the below description. In particular, one or more embodiments of the font recognition system will be described below with reference to one or more figures. In addition, the following definitions of terms will be used to describe one or more features of the font recognition system.

As used herein, the term "text image" refers to any type of electronic document or file that includes written text (i.e., glyph content) in one or more digital fonts. For example, a text image can include an electronic document in the form of an image file (permanent or temporary), a clipboard file, a word-processing document, a portable document file (PDF), an e-mail file, a text file, a web page, or any other electronic file. A text image can originate from a physical source, such as an advertisement, brochure, flyer, book, magazine, periodical, or other publication.

As used herein, the term "digital font" (or simply "font") refers to a defined set of digital characters (e.g., glyphs). In particular, the term "font" includes a collection of digital characters of a particular style or typeface. A font includes digital files with the extensions, such as, but not limited to: .ttf, .otf, .fnt, .abf, .ttc, .suit, .woff, .vnf, .t65, .sfp, .sad, .pmt, .pfm, .pfb, .pfa, .odtff, .mf, .gdr, .fon, .fnt, .font, .etx, .eot, .compositefont, .acfm, .afm, or .amfm. For example, the term digital font includes fonts entitled Times New Roman, Helvetica, Arial, PT Sans Regular, Corbel, or other font titles.

A font can be represented by a font feature vector. As used herein, the term "font feature vector" (or simply "feature vector") refers to a vector of numeric values representing characteristics and attributes of a font. In particular, the term "feature vector" includes a set of values corresponding to latent and/or patent attributes and characteristics of a font. In one or more embodiments, a feature vector is a multi-dimensional dataset that represents a font. In one or more embodiments, a feature vector includes a set of numeric metrics learned by a machine-learning algorithm such as a neural network. For example, a feature vector can include font glyph data, such as glyph curvature, glyph spacing, glyph size, glyph shape, glyph width, glyph height, glyph location (e.g., glyph location in relation to a baseline), glyph area, glyph orientation, number of curves per glyph, arc length, glyph contrast, and font classification features (e.g., font features utilized to classify a font). Further, a feature vector can provide numeric values for the font class and font characteristics of a font. In some embodiments, the term feature vector and feature representation are used interchangeably as a feature vector is an example of a feature representation.

As described above, feature vectors can provide a numerical representation of a font classification (i.e., font class), and font characteristics. As used herein, the term "font classification" refers to a font category and/or font name and can include pre-defined categories utilized to classify digital fonts. For instance, font classifications include font classes (i.e., Serif, Sans Serif, Slab Serif, Script, Blackletter, Mono, Hand, or Decorative). In some embodiments, the term "font characteristic," also refers to attributes corresponding to a font, such as style (e.g., regular, bold, italic, shadowed, underlined, strikethrough, subscript, or superscript), weights (e.g., light, regular, and heavy weights), widths (e.g., condensed, regular, and extended widths), capitalization styles (e.g., all caps, small caps, title case, and sentence case), x-heights (e.g., small, regular and large x-heights), and contrasts (e.g., low, regular, and high contrasts).

The term "font probability vector" corresponds to a set of values that provide a correlation between an input font and known fonts. In particular, the term "font probability vector" includes an n-dimensional vector where n corresponds to a number of known fonts. For each of the n known fonts, the font probability vector includes a matching probability that the input font matches the known font. In some cases, a font classifier generates a font probability vector by comparing (e.g., based on vector space distance) the feature vector generated for an input font to feature vectors of each known font to determine the matching probability between the input font and the known font.

In addition, the term "hybrid font probability vector" corresponds to a combination of multiple font probability vectors. In particular, the term "hybrid font probability vector" refers to combining a first weighted font probability vector and at least a second weighted font probability vector (and possibly additional weighted font probability vectors). For example, in one or more embodiments, the hybrid weights sum to one (or approximately one). In this manner, while a hybrid font probability vector is a compilation of multiple font probability vectors from multiple font recognition neural networks, the hybrid font probability vector has a similar overall weight of a single font probability vector. In this manner, a hybrid font probability vector can be used in connection with a single font classification loss model to train one or more neural networks (e.g., multiple font recognition neural networks as well as a weight prediction neural network).

As mentioned above, a weight prediction neural network can predict a font classification probability of each font probability vector used in a hybrid font probability vector. As used herein, the term "font classification probability" refers to the predicted weight associated with a given font recognition neural network in a hybrid font recognition neural network. In particular, the weight prediction neural network outputs a prediction vector that includes a font classification probability for each font recognition neural network in a hybrid font recognition neural network. Indeed, the font classification probability indicates the probability that the given font recognition neural network will better classify a given text image (e.g., correctly identify the input digital font more often and/or with higher accuracy) than other font recognition neural networks in the hybrid font recognition neural network. For example, if a hybrid font recognition neural network includes j font recognition neural networks, then the prediction vector is a j-dimensional prediction vector that includes j font classification probabilities. Further, the font classification probabilities in a prediction vector can sum to one or 100%.

The term "machine learning," as used herein, refers to the process of constructing and implementing algorithms that can learn from and make predictions on data. In general, machine learning may operate by building models from example inputs (e.g., training), such as a training font set, to make data-driven predictions or decisions. In some example embodiments, machine learning is used for data mining, and statistical pattern recognition, such as collaborative feature learning, or learning features from a training font set.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"). In addition, a neural network is an algorithm (or set of algorithms) that implements deep learning techniques that utilize a set of algorithms to model high-level abstractions in data. As used herein, a neural network refers to a neural network having a regression loss model in the loss layer (e.g., a font classification loss model or a triplet loss model). The description and figures below generally refer to a CNN.

As used herein, the term "loss function" or "loss model" refers to a function that indicates error loss between feature vectors and/or probability vectors in multi-dimensional vector space. A machine-learning algorithm (e.g., neural network) can repetitively train to minimize and/or maximize font classification error loss (e.g., how accurate or inaccurate the font classification is to the actual trained font). In some embodiments, the font recognition system employs loss functions at different stages of training. An example of a loss function includes a font classification loss model, which uses a softmax font classifier with cross-entropy loss, as further described below.

Referring now to the figures, FIG. 1 illustrates a diagram of a general process 100 for training a hybrid font recognition neural network. For instance, in various embodiments, a font recognition system implements the process 100 to initially train separate font recognition neural networks. The font recognition system implements the process 100 to also train a hybrid font recognition neural network that includes each of the initially trained font recognition neural networks as well as a weight prediction neural network. The font recognition system can be implemented by one or more computing devices, such as one or more server devices, one or more client devices, or a combination of server devices and client devices.

As an initial matter, the figures describe the font recognition system with respect to Japanese fonts and glyphs (e.g., both the logographic kanji and syllabic kana writing styles). One will appreciate that the techniques, operations, methods, and actions described with respect to the font recognition system and the figures apply to other types of fonts and glyphs, and in particular, fonts that suffer from negative side effects of intra-class variances of glyph content. For example, the actions techniques, operations, methods, and actions described herein can relate to classifying fonts for text images that include glyphs written any combination of languages (i.e., a multi-language font recognition system), as further described below.

As shown in FIG. 1, the font recognition system generates 102 a generic font recognition neural network. As further described below, within the hybrid font recognition neural network, font recognition neural networks can be convolutional neural networks or other types of classification neural networks. The generic font recognition neural network, in one or more embodiments, can be trained using multiple glyph sets or styles. For example, the font recognition system generates and trains a font recognition neural network that classifies fonts based on a mixture of both kanji and kana Japanese glyphs. In alternative embodiments, the generic font recognition neural network includes glyphs from multiple different languages (e.g., Japanese and English). The font recognition system can employ a font classification loss model to train the generic font recognition neural network, as further described below.

As part of training the generic font recognition neural network, the font recognition system can generate a first set of training text images. For instance, the font recognition system generates a set of Japanese font text images that includes various Japanese fonts written using kanji and kana glyphs (or written using glyphs from different languages). The font recognition system can generate thousands or millions of text images as part of the first set of training text images. Additional description regarding generating and rendering text images is provided below with respect to FIG. 2A.

In addition, FIG. 1 illustrates the font recognition system generating 104 a specific font recognition neural network. For instance, the font recognition system generates a specific font recognition neural network that is trained based on a single glyph set or style. For example, the specific font recognition neural network can be trained using one of the glyph sets or styles used to train the generic font recognition neural network. For example, the font recognition system trains the specific font recognition neural network based on training text images that include kanji glyphs but not kana glyphs (e.g., a kanji-specific font recognition neural network). As with the first training text image set, the font recognition system can also generate a second set of training text images to train the specific font recognition neural network.

Upon training the generic font recognition neural network and the specific font recognition neural network, the font recognition system trains 106 a hybrid font recognition neural network by combining the generic and specific font recognition neural networks with a weight prediction neural network, as shown in FIG. 1. In particular, the font recognition system fine-tunes the font recognition neural networks while training the weight prediction neural network from scratch. As detailed below, the font recognition system can simultaneously train the font recognition neural networks (i.e., generic and specific) and the weight prediction neural network with a single font classification loss model.

When trained, the hybrid font recognition neural network provides improved font classifications for input text images. For example, upon receiving an input text image that includes one or more of kana or kanji Japanese glyphs, the font recognition system provides the input text image to the generic font recognition neural network, the specific font recognition neural network, and the weight prediction neural network. The generic font recognition neural network outputs a first font probability vector for the input text image. Likewise, the specific font recognition neural network outputs a second font probability vector. The first and second font probability vectors can indicate that the font of the input text is the same or different.

In addition, the weight prediction neural network outputs a two-dimensional prediction vector that includes a first font classification probability (e.g., a first classification weight or $w_1$). The first font classification probability indicates the probability that the generic font recognition neural network will better classify the font in the input text image than the specific font recognition neural network. The prediction vector also includes a second font classification probability (e.g., a second classification weight or $w_2$). The second font classification probability indicates the probability that the specific font recognition neural network will better classify the font in the input text image.

The hybrid font recognition neural network generates a hybrid font probability vector that includes the first weighted font probability vector and the second weighted font probability vector. Using the hybrid font probability vector, the font recognition system identifies the font used in the input text image. The hybrid font recognition neural network is further described below in connection with FIGS. 2B and 2C.

In one or more embodiments, rather than generate a generic font recognition neural network and a specific font recognition neural network, the font recognition system can generate two specific font recognition neural networks that train based on different glyph sets or styles. For example, the first specific font recognition neural network can train exclusively with a first type of glyph (kanji, Roman, Japanese, etc.) while the second specific font recognition neural network trains exclusively with a second type of glyph (kana, Japanese, Chinese, etc.).

Figure 2A:
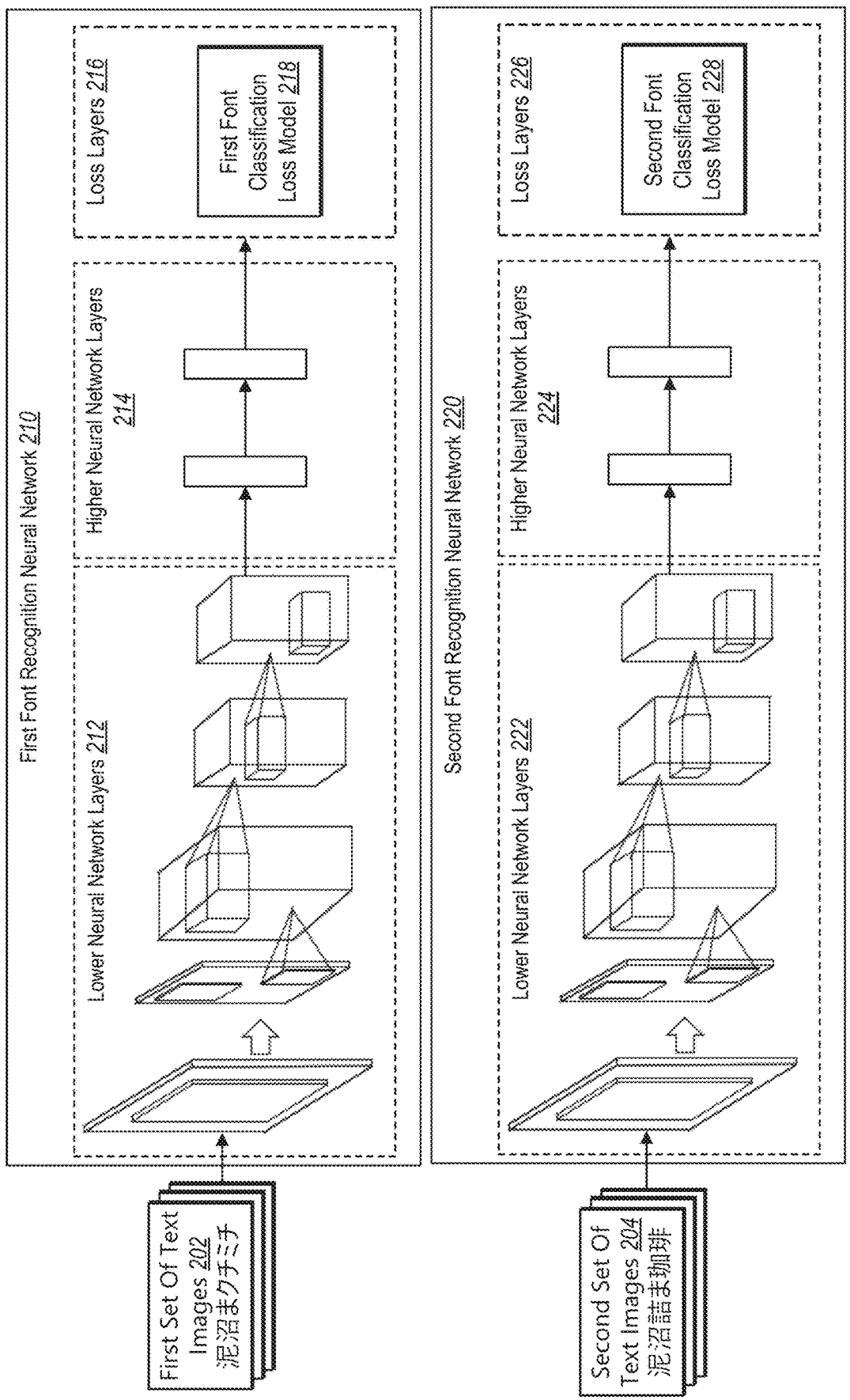
FIGS. 2A and 2B illustrate training a hybrid font recognition neural network using the weight prediction neural network and a font classification loss model training font set in accordance with one or more embodiments.
Figure 2B:
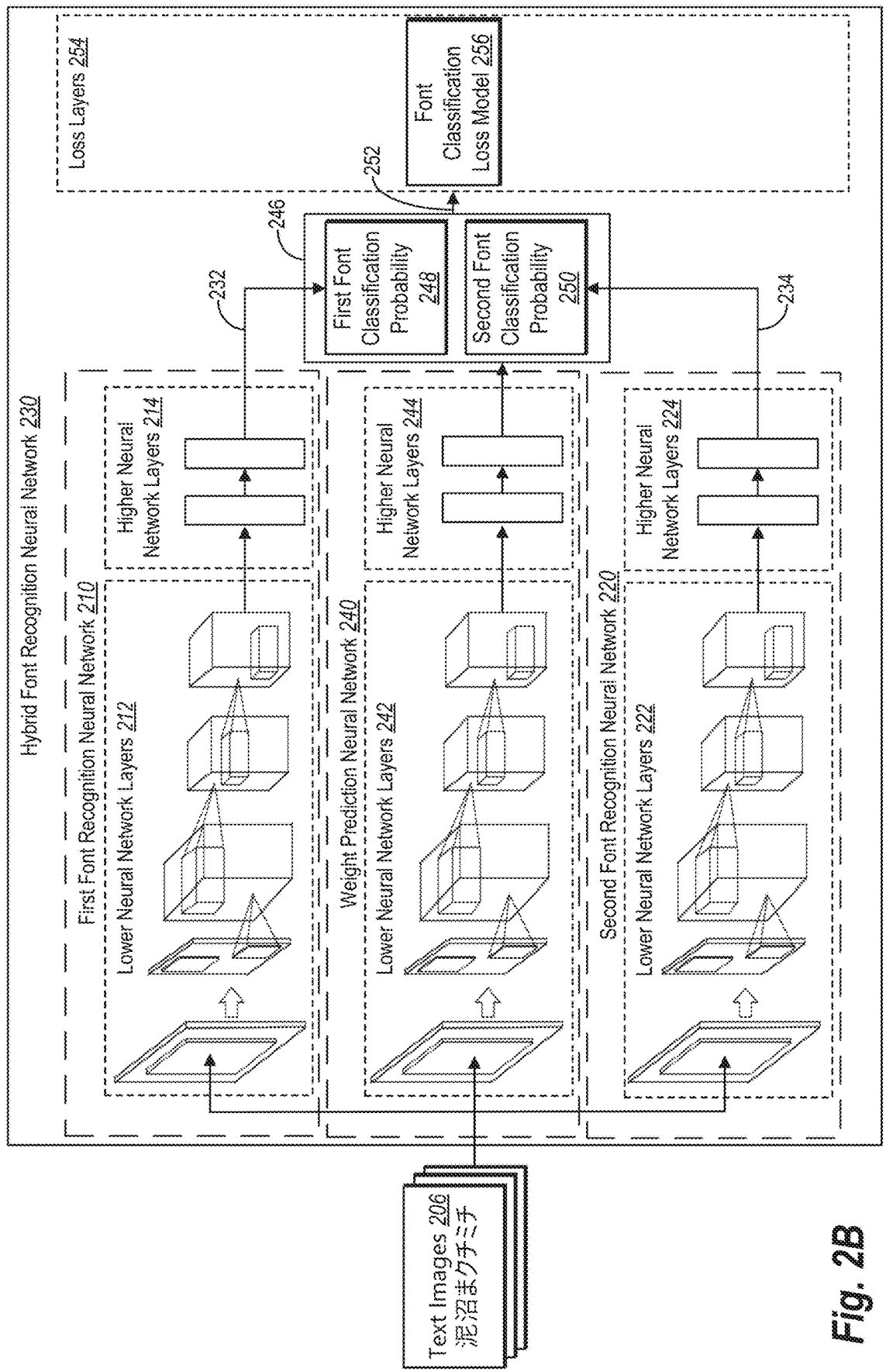
Figure 2C:
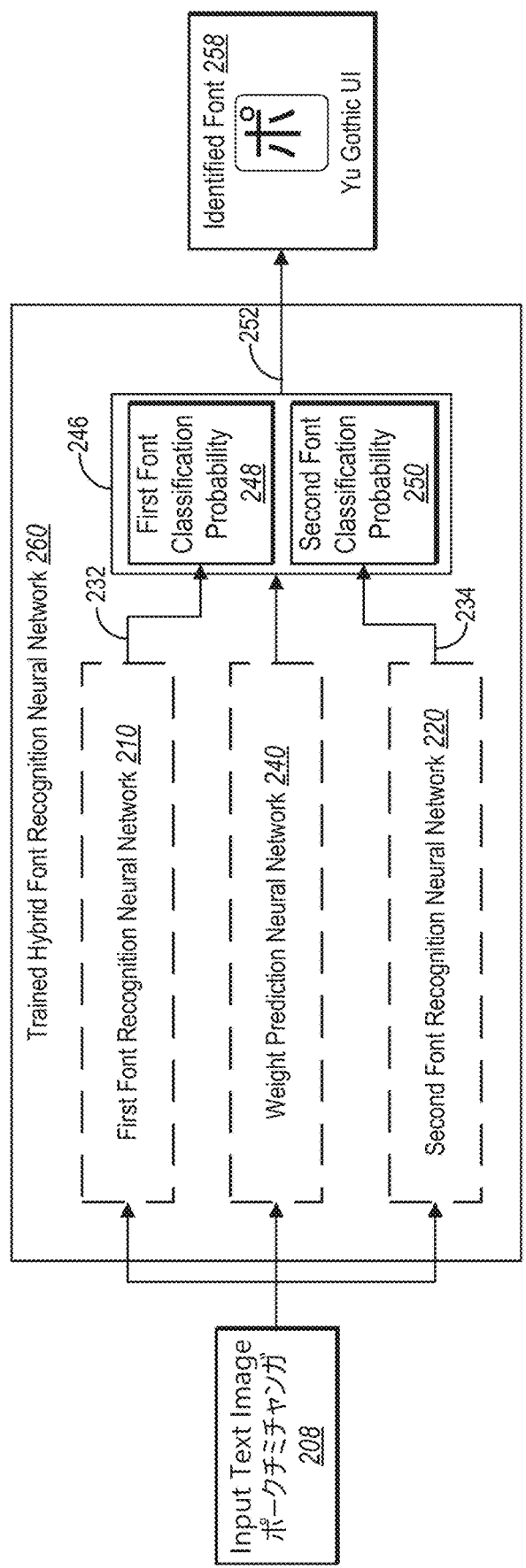
FIG. 2C illustrates a diagram of employing the trained hybrid font recognition neural network to identify a font within an input text image in accordance with one or more embodiments.

As mentioned above, FIGS. 2A-C illustrate a diagram of a more detailed process for training the hybrid font recognition neural network. In particular, FIG. 2A shows initially training separate font recognition neural networks (e.g., a first font recognition neural network 210 and a second font recognition neural network 220) using a font classification loss model. FIG. 2B shows a fully-training the hybrid font recognition neural network 230 by adding a weight prediction neural network 240. FIG. 2C illustrates employing the trained hybrid font recognition neural network 260 to identify a font in an input text image.

As shown, FIG. 2A includes a first set of text images 202 used to train a first font recognition neural network 210. FIG. 2A also shows a second set of text images 204 used to train to a second font recognition neural network 220. In one or more embodiments, the first font recognition neural network 210 is a generic font recognition neural network trained using multiple glyph styles (e.g., kanji and kana glyphs). Further, the second font recognition neural network 220 is a specific font recognition neural network that is trained using one or more, but not all, glyph styles of the generic font recognition neural network (e.g., kanji glyphs). In alternative embodiments, the first font recognition neural network 210 and the second font recognition neural network 220 are both specific font recognition neural networks trained using a single type of glyph, as mentioned previously.

Before describing how the font recognition system trains each of the font recognition neural networks, additional detail is provided regarding obtaining/generating the sets of text images for training. As shown, FIG. 1 includes the first set of text images 202 and the second set of text images 204. The first set of text images 202 includes text images generated from both kanji and kana glyphs. The second set of text images 204 includes text images generated from kanji glyphs, but not kana glyphs. In some embodiments, the second set of text images 204 includes some overlapping text images with the first set of text images 202. In alternative embodiments, the first set of text images 202 and the second set of text images 204 are generated separately.

To obtain the sets of text images for training (e.g., the first set of text images 202 and the second set of text images 204), the font recognition system can generate, render, or otherwise obtain text images. For instance, the font recognition system randomly pairs a font with one or more glyphs (e.g., kanji and/or kana glyphs) to render a large number of training text images. In some embodiments, the font recognition system renders millions of training text images that display the random glyphs/font combination for either or both the first set of text images 202 and the second set of text images 204.

More specifically, in one or more embodiments, the font recognition system renders the text images by randomly selecting one or more glyphs from a subset of glyphs, such as the 500 most used Japanese glyphs (e.g., kanji and kana or just kanji—depending on the text image set), the top 25% most used Japanese glyphs, 10,000 randomly selected Japanese glyphs, or another subset number of glyphs. Note, for text images in the first set of text images 202, the font recognition system can select and write both a kanji glyph and a kana glyph together in a single text image. In addition, the font recognition system selects a font in which to write the glyph(s). For example, the font recognition system chooses one of 600 Japanese fonts in which to write the glyph(s). Upon writing the selected glyph(s) in the selected font, the font recognition system renders the written glyph as a text image and adds the rendered text image to a set of text images.

In alternative, or additional, embodiments, the font recognition system obtains one or more Japanese font training sets of text images. For example, the font recognition system previously created a training font set of text images, which is stored in a font database, either locally or remotely. In another example, the font recognition system obtains a training font set from a third-party font repository. The font recognition system can combine one or more training font sets with newly rendered text images.

In various embodiments, the font recognition system randomly introduces deviations into the text images in a set of text images. For example, the font recognition system randomly introduces noise (e.g., a small Gaussian noise with zero mean and a standard deviation of three), blur (e.g., a random Gaussian blur with standard deviation between two and four), perspective rotation (e.g., a randomly-parameterized affine transformation), and/or shading (e.g., random gradients that fill the input background) into some of the text images. In addition, the font recognition system can add variable character spacing and/or variable aspect ratio modifications to the text images. These deviations add robustness while training each font recognition neural network as well as enable a trained font recognition neural network to better recognize real-world text images that often naturally contain noise.

Turning now to training the font recognition neural networks, the font recognition system can train both the first font recognition neural network 210 and the second font recognition neural network 220 in a similar manner. Indeed, while the first set of text images 202 (e.g., kana and kanji glyphs) differs from the second set of text images 204 (e.g., kanji glyphs only), the actions of the font recognition system training each font recognition neural network can be analogous when the first and second font recognition neural networks are both of the same neural network type (e.g., convolutional neural networks). Alternatively, and particularly when the first and second font recognition neural networks are of different classification neural network types, the font recognition system can train the font recognition neural networks using different actions. For ease of explanation, the description provided with respect to training the first font recognition neural network 210 can be similarly applied to training the second font recognition neural network 220 and/or additional font recognition neural networks.

As shown, the first font recognition neural network 210 includes lower neural network layers 212, higher neural network layers 214, and loss layers 216. The loss layers 216 include a first font classification loss model 218. In one or more embodiments, the lower neural network layers 212 are convolutional layers that encode fonts into feature vectors. The higher neural network layers 214 can comprise fully-connected layers that classify the feature vector and outputs a first font probability vector. Because of their functions, the lower neural network layers 212 are collectively called an encoder and the higher neural network layers 214 are collectively called a font classifier. In some embodiments, the first font recognition neural network is 210 a deep learning convolutional neural network.

The font recognition system can initially train the first font recognition neural network 210 using the first font classification loss model 218. As an overview, the font recognition system initially trains the first font recognition neural network 210 by tuning parameters based on the first set of text images 202, which are used to generate font classifications. In addition, the font recognition system employs the first font classification loss model 218 to provide feedback based on the accuracy of the font classifications, which enables the font recognition system to update the tunable parameters. More specifically, the font recognition system uses error loss feedback to tune font feature extractions in the lower neural network layers 212 and higher neural network layers 214 to classify fonts from input training images.

To demonstrate, the font recognition system can provide the first set of text images 202 (e.g., both kanji and kana glyphs) as input to initially train the first font recognition neural network 210. For example, in one or more embodiments, the font recognition system trains the lower neural network layers 212 by tuning font feature extractions parameters, which are used to a generate feature vector for each input font in the first set of text images 202. The font recognition system then provides the generated feature vector to the higher neural network layers 214, which compares the generated feature vector from the lower neural network layers 212 to feature vectors of known fonts (e.g., feature vectors learned from fonts in the first set of text images 202) based on font classification parameters. Based on the feature vector comparison, the higher neural network layers 214 employ the font classification parameters to generate a first font probability vector, which indicates a correspondence between the input font to each of the known fonts based on the feature vector comparisons.

Next, the font recognition system provides the first font probability vector to the first font classification loss model 218. The first font classification loss model 218 compares the identified font indicated in the first font probability vector to the actual font employed in the training text image to determine an amount of font classification error loss (or simply "error loss"). Indeed, the font recognition system can provide the first font probability vector to the font classification loss model to determine the accuracy and/or error loss of the font classification. In some embodiments, the first font classification loss model 218 employs a softmax cross-entropy loss font classifier and/or mean square error computations to determine the amount of font classification loss. For instance, the first font classification loss model 218 identifies when a first font probability vector is beyond a threshold distance from font features corresponding to an input font within the learned feature space, and/or how far beyond the threshold distance (e.g., error loss) the first font probability vector is from the input font.

Then, using the error loss to train and optimize the neural network layers of the first font recognition neural network 210, the font recognition system can employ back propagation and end-to-end learning to tune feature extraction parameters within layers of the first font recognition neural network 210. For instance, in one or more embodiments, the font recognition system takes the error loss output from the first font classification loss model 218 and provides it back to the lower neural network layers 212 and/or the higher neural network layers 214 until the error loss from the first font classification loss model 218 is minimized. In particular, the first font classification loss model 218 provides feedback to the lower neural network layers 212 to further tune the font feature extraction parameters and/or the higher neural network layers 214 to further tune the font classification parameters. In this manner, the font recognition system iteratively trains (e.g., about 20,000 iterations) the first font recognition neural network 210 to learn a set of best-fit parameters that extract font features from a text image and accurately classifies a corresponding input font.

As mentioned above, in some embodiments, the font recognition system employs the higher neural network layers 214 to determine a font probability vector of an input font of an input text image. As an example of a font probability vector, if the first set of text images 202 includes 600 fonts, the higher neural network layers 214 outputs a 600-dimensional font probability vector with entries ranging between zero and one (i.e., [0-1]). Each dimensional in the font probability vector provides a correspondence (e.g., matching probability based on vector space distance) between the feature vectors of an input font and the feature vectors of each font in the first set of text images 202. In some embodiments, the font recognition system can store each feature vector as part of the first font recognition neural network 210 (e.g., in a font feature space).

As mentioned above, the font recognition system can initially train the second font recognition neural network 220 in a similar manner. For example, the font recognition system employs the second set of text images 204 that include only kanji glyphs to train font feature extraction parameters in the lower neural network layers 222 and font classification parameters in the higher neural network layers 224. Then the font recognition system uses a second font classification loss model 228 in the loss layers 226 of the second font recognition neural network 220, as described above for corresponding component and elements.

Upon initially training the font recognition neural networks, the first font recognition neural network 210 can generally identify the font for a text image written in kanji or kana glyphs and the second font recognition neural network 220 can likewise generally identify the font for a text image written in kanji glyphs. However, the initially trained font recognition neural networks by themselves may not produce accurate results for many types of fonts due to the negative side effect caused by intra-class variances from diverse glyph content. For example, each of the initially trained font recognition neural networks will likely misidentify the font in an input text image if the text image includes one or more of glyphs not seen in training. Further, the second font recognition neural network 220 will not be able to classify text images of kana glyphs.

To improve recognition accuracy and increase font generalization, the font recognition system creates a font recognition neural network that utilizes both the first font recognition neural network 210 and the second font recognition neural network 220 to reduce and/or remove the negative side effects of intra-class variances from diverse glyphs. To illustrate, FIG. 2B shows a hybrid font recognition neural network 230 that utilizes both the first font recognition neural network 210 and the second font recognition neural network 220. In addition, the hybrid font recognition neural network 230 includes a weight prediction neural network 240.

As shown, the weight prediction neural network 240 includes lower neural network layers 242 and higher neural network layers 244. In one or more embodiments, the weight prediction neural network 240 is a convolutional neural network, where the lower neural network layers 242 are convolutional layers and the higher neural network layers 244 are fully-connected layers. In addition, the weight prediction neural network 240 is generally smaller than the font recognition neural networks because the weight prediction neural network 240 is learning and generating a low-dimensional probability vector (e.g., prediction vector 246). Thus, the weight prediction neural network 240 can be a convolutional neural network that includes fewer layers than the font recognition neural networks 210, 220.

Additionally, in various embodiments, the lower neural network layers 242 of the weight prediction neural network 240 encode a feature vector and the higher neural network layers 244 generate a two-dimensional prediction vector 246 that includes a first font classification probability 248 (corresponding to the first font recognition neural network 210) and a second font classification probability 250 (corresponding to the second font recognition neural network 220). In particular, the first font classification probability indicates the probability that the first font recognition neural network 210 will classify the font in a given image better than the second font recognition neural network 220. Similarly, the second font classification probability indicates the probability that the second font recognition neural network 220 will classify the font in the given image better than the first font recognition neural network 210.

The font recognition system can train the hybrid font recognition neural network 230 using the initially trained first and second font recognition neural networks. For example, the font recognition system provides a text image 206 to each of the first font recognition neural network 210, the second font recognition neural network 220, and the weight prediction neural network 240. The text image 206 can include text images from the first set of text images 202, the second set of text images 204, and/or newly generated text images. In some instances, the text images 206 are a mix of text images of Japanese glyphs (e.g., both kanji and kana). In any case, the font recognition system can train the weight prediction neural network to make accurate predictions as to which font recognition neural network will best classify a given text image without the need of additional information about the glyph content within a text image. For example, the font recognition system does not perform, or need to perform, optical character recognition to recognize whether current text is one type of glyph or another.

For each text image, the first font recognition neural network 210 generates a first font probability vector 232 and the second font recognition neural network 220 generates a second font probability vector 234, as described above. In addition, the weight prediction neural network 240 generates a prediction vector 246 that includes a first font classification probability 248 that indicates the probability that the first font probability vector 232 will better classify the font in the text image than the second font probability vector 234.

The prediction vector 246 also includes an opposing second font classification probability 250. In various embodiments, the weight prediction neural network 240 initially assigns random values or predetermined values (e.g., 25/75) to the font probability vectors. As training continues, the weight prediction neural network 240 learns to more accurately predict font classification probabilities for given text images, as further described below. In this manner, the font recognition system trains the weight prediction neural network 240 to dynamically arrive at accurate predictions without requiring additional label information or annotations about the glyph content within the text images.

To demonstrate, the font recognition system first generates a hybrid font probability vector 252 based on the outputs of the font recognition neural network 210, second font recognition neural network 220, and the weight prediction neural network 240. More specifically, the font recognition system weights the first font probability vector 232 by the first font classification probability 248. Likewise, the font recognition system weights the second font probability vector 234 by the second font classification probability 250. The font recognition system then combines the two weighted feature vectors to generate a hybrid font probability vector 252. Because the first font classification probability 248 and the second font classification probability 250 sum to one, the hybrid font probability vector 252 has a similar overall weight of a single font probability vector. A numerical example of creating a hybrid font probability vector 252 is provided with respect to FIG. 3.

In addition, the font recognition system provides the hybrid font probability vector 252 to the font classification loss model 256 within the loss layers 254 of the hybrid font recognition neural network 230. The font classification loss model 256 operates in a similar manner to the font classification loss models described above. For instance, the font classification loss model 256 determines a font classification error loss between the font in a given text image and one or more fonts indicated in the hybrid font probability vector 252. Accordingly, the font classification error loss is a mixture of weighted error loss from the first font probability vector 232 and weighted error loss from the second font probability vector 234 (where the assigned weights either minimize or exaggerate the error loss depending on the accuracy of the weighted predictions).

As described previously, the font recognition system provides feedback to the hybrid font recognition neural network 230. For instance, the font classification loss model 256 provides feedback to the first font recognition neural network 210, the second font recognition neural network 220, and the weight prediction neural network 240. In some embodiments, the font recognition system provides feedback to each neural network using the same learning rate.

In alternative embodiments, the font recognition system provides feedback to each neural network using different learning rates. For example, because the first font recognition neural network 210 and the second font recognition neural networks 220 have previously been trained, the font recognition system provides the error loss at a small learning rate (e.g., $1e^{-6}$), which fine-tunes the parameters of the font recognition neural networks. Further, because the weight prediction neural network is being trained for the first time, the font recognition system provides the error loss at a large learning rate (e.g., $1e^{-3}$) to the weight prediction neural network during training, which more quickly tunes the font classification parameters to better predict which font recognition neural network will better classify a given text image. Indeed, the weight prediction neural network 240 automatically learns font classification parameters that are well-suited to making accurate predictions regarding which font recognition neural network will best classify a given text image.

The font recognition system can iteratively repeat the overall feedback and optimization cycle until the hybrid font recognition neural network 230 is trained. For instance, the hybrid font recognition neural network 230 continues to feed the text images 206 and optimize the layers of the hybrid font recognition neural network 230 until the neural network converges. In particular, the font recognition system trains the weight prediction neural network 240 by slowly reducing the learning rate as the weight prediction neural network 240 increases in prediction accuracy. The font recognition system can conclude training when the overall cross-entropy font classification error loss at the font classification loss model 256 based on the hybrid font probability vectors is minimized and/or the hybrid font recognition neural network 230 stabilizes.

As mentioned above, the hybrid font recognition neural network 230 can include more than two font recognition neural networks. For example, in some embodiments, the hybrid font recognition neural network 230 includes three or four font recognition neural networks. In these embodiments, the weight prediction neural network 240 generates a three-dimensional or four-dimensional prediction vector that includes three or four font classification probabilities, respectively, which sum to one or 100%. In this manner, the font recognition system combines the weighted font probability vectors from each of the font recognition neural networks to form a hybrid font probability vector 252 that has a similar overall weight of a single font probability vector. Further, using the hybrid font probability vector 252, the font recognition system can use a single font classification loss model 256 to train the hybrid font recognition neural network 230, including automatically training the weight prediction neural network 240.

Once trained, the font recognition system can employ the hybrid font recognition neural network 230 to recognize fonts in input text images that include both kana glyphs and kanji glyphs. To illustrate, FIG. 2C shows a trained hybrid font recognition neural network 260. In particular, the trained hybrid font recognition neural network 260 includes the trained first font recognition neural network 210, the trained second font recognition neural network 220, and the trained weight prediction neural network 240.

As shown, the font recognition system obtains an input text image 208. For instance, the font recognition system detects a user's request to identify the font that was used in the input text image 208. For example, the font recognition system receives a copy of the input text image 208 within an application (e.g., a desktop or mobile application). The input text image 208 can include one or more unknown Japanese glyphs written in an unknown font.

In response to receiving the input text image 208, the font recognition system uses the trained hybrid font recognition neural network 260 to recognize the font in the input text image. In particular, the font recognition system provides the input text image 208 to the first font recognition neural network 210, the second font recognition neural network 220, and the weight prediction neural network 240. The first font recognition neural network 210 classifies the font in the input text image 208 and generates a first font probability vector 232. Likewise, the second font recognition neural network 220 separately classifies the font in the input text image 208 and generates a second font probability vector 234.

Each of the font recognition neural networks 210, 220 generates a font probability vector. To demonstrate, the first font recognition neural network 210 receives the input text image 208 and generates a feature vector using the trained (e.g., tuned) font feature extraction parameters. Using the generated feature vector, the font recognition neural network 210 uses trained font classification to generate the first font probability vector 232. In particular, the first font recognition neural network 210 compares the feature vector of the font in the input text image 208 to feature vectors of known fonts generated using the trained hybrid font recognition neural network 260 to generate the first font probability vector 232 (e.g., a 600-dimension font probability vector based on the 600 known fonts).

In addition to the font recognition neural networks generating probability vectors, the weight prediction neural network 240 generates a prediction vector 246 based on the font and/or glyphs in the input text image 208. The prediction vector 246 includes a first font classification probability 248 and a second font classification probability 250. As mentioned above, the first font classification probability 248 provides a predicted probability that the first font probability vector 232 better classifies the font in the input text image 208 than the second font probability vector 234. For example, the first font classification probability 248 is a probability of weight between 0 and 100%. Likewise, the second font probability vector 234 indicates the opposing probability that the second font probability vector 234 better classifies the font in the input text image 208 than the first font probability vector 232.

Using the generated font probability vectors and the font classification probabilities, the font recognition system generates a hybrid font probability vector 252. For instance, the font recognition system weights each font probability vector by the corresponding font classification probability and combines the weighted font probability vectors together. Using the hybrid font probability vector 252, the font recognition system identifies the font in the text image 208 as the identified font 258. As mentioned above, a numerical example of creating a hybrid font probability vector is provided with respect to FIG. 3.

In some embodiments, the feature vector generated by a font recognition neural network for the font in the input text image 208 does not exactly match the feature vector of a known font trained by that font recognition neural network (e.g., the distance between the two feature vectors will be greater than zero). Further, a known font can have multiple feature vectors for a font recognition neural network, such as one feature vector for each time the known font appeared in a text image in the training font set. Accordingly, in these embodiments, for a particular font recognition neural network, the font recognition system compares the feature vector of the input font to the average feature representation (i.e., collecting of corresponding feature vectors for a font) of a known font when gendering a matching probability for the font. In particular, the font recognition system identifies the known font that has an average feature representation that is the smallest distance from the feature vector of the input font.

Upon determining the identified font 258, the font recognition system can present the identified font 258 to the user. For example, the font recognition system presents the identified font 258 to the user within a graphical user interface. In one or more embodiments, the font recognition system recreates the text in the input text image 208 using the identified font 258. In various embodiments, the font recognition system automatically applies the identified font 258 to a portion of text within an electronic document.

In some embodiments, the font recognition system determines that the client device being used does not have the identified font 258. In such cases, the font recognition system can assist a user in obtaining (e.g., downloading, purchasing, installing, or otherwise accessing) the identified font 258. In alternative embodiments, if the identified font 258 is too expensive to access, the font recognition system can provide a similar font to the user that is more economical.

Similarly, in one or more embodiments, the font recognition system also provides a list of similar fonts to the user. For example, the font recognition system identifies five fonts from the set of known fonts that are similar (e.g., based on matching probabilities indicated in the hybrid font probability vector) to the input font in the input text image 208. In some embodiments, when the font recognition system cannot identify the same font as the input font, the font recognition system provides the closest matching known font.

As mentioned above, the font recognition system can obtain input text images, such as training font sets (e.g., the first set of text images 202, the second set of text images 204, text images 206) or an input text image 208. In one or more embodiments, the font recognition system first crops the text image to one or two glyphs. For example, when the font recognition system detects that a text image includes multiple glyphs, the font recognition system determines a break between each glyph or pairs of glyphs. For at least one of the glyphs, the font recognition system generates a smaller cropped text image, which is provided to a font recognition neural network, such as the first font recognition neural network or the hybrid font recognition neural network. In general, glyphs in a text image are written in the same font, so any of the generated cropped text images can be used to train or identify the font used in the text image.

In some embodiments, the font recognition system generates multiple cropped text images from a text image that includes multiple glyphs. In these embodiments, the font recognition system can provide each of the cropped text images to a font recognition neural network. The additional cropped text images can reinforce training or used for testing. Similarly, the font recognition system can use the additional cropped text images to further confirm a recognized font in a text image. An example of a text image with multiple glyphs is provided in FIG. 7A.

Turning now to FIG. 3, additional detail is provided regarding generating a hybrid font probability vector. In particular, FIG. 3 illustrates a table 300 for generating a hybrid font probability vector using the hybrid font recognition neural network in accordance with one or more embodiments. As shown, the columns in the table 300 include fonts 302, a first font probability vector value 304, a second font probability vector values 306, a first font classification probability value 308, a second font classification probability value 310, and a hybrid font probability vector values 312.

For additional context, the table 300 will be described with respect to the trained hybrid font recognition neural network 260. For example, the font recognition system provides an input text image 208 to the trained hybrid font recognition neural network 260. The trained hybrid font recognition neural network 260 distributes the input text image to the first font recognition neural network 210, the second font recognition neural network 220, and the weight prediction neural network 240. The first and second font recognition neural networks each classify the font in the input text image 208 with respect to known and trained fonts (e.g., the first font classification probability 232 and the second font probability vector 234).

As shown, the fonts 302 in the table 300 include fonts included in a training font set for which the hybrid font recognition neural network was trained. For simplicity, only three fonts (i.e., Font A, Font B, and Font C) are included in the fonts 302. Accordingly, the hybrid font recognition neural network 260 is trained to recognize the font in the input text image 208 that includes glyphs (e.g., kanji or kana) written in one of the three fonts 302. Further, if the font in the input text image 208 is not written in one of the fonts 302, in some embodiments, the trained hybrid font recognition neural network 260 finds the closest matching font, or in the alternative, indicate that the font could not be identified.

As shown in the table 300, the first font probability vector values 304 indicates classification values output by the first font recognition neural network 210 for the font in the input text image 208. As shown in the first font probability vector values 304, the first font recognition neural network 210 indicates that the input font matches Font A at 95%, Font B at 5%, and Font C at 0%. Similarly, as shown in the second font probability vector values 306, the second font recognition neural network 220 classifies the input font as matching Font A at 40%, Font B at 40%, and Font C at 20%.

As also illustrated in the table 300, the first font recognition neural network 210 and the second font recognition neural network 220 produce different font classifications for the same input font. For instance, the input font is a kana glyph and the first font recognition neural network 210 is trained on both kana and kanji glyphs. As such, the first font recognition neural network 210 better recognizes the input font. In addition, the second font recognition neural network 220 is not trained with any kana glyphs, and thus, is less certain at classifying the input font.

The table 300 also includes the first font classification probability value 308 and the second font classification probability value 310. As described above, the weight prediction neural network 240 determines a prediction vector 246 based on the input text image that includes the font classification probabilities corresponding to the first and second font recognition neural networks. As shown, the first font classification probability value 308 is 80% and the second font classification probability value 310 is 20%. In this manner, based on the input text image, the weight prediction neural network 240 predicts that the first font recognition neural network 210 is a better font classification than the second font recognition neural network 220. For example, the weight prediction neural network 240 recognizes the glyph in the text image as a kana glyph and, based on training, has learned that the first font recognition neural network 210 frequency classifies kana glyphs correctly while the second font recognition neural network 220 often misclassifies kana glyphs.

In an alternative example, the weight prediction neural network 240 may recognize the glyph in the input text image as kanji and determine that the second font recognition neural network 220 better classifies text images written in kanji. However, because the weight prediction neural network 240 is trained in connection with the first and second font recognition neural networks, the weight prediction neural network 240 could detect a kanji glyph and still predict that the first font recognition neural network 210 will better classify the font in the text image. In other words, the weight prediction neural network 240 learned that for particular kanji glyphs, the first font recognition neural network 210 is a better font classification despite the first font recognition neural network 210 being a generic kana and kanji glyph neural network and the second font recognition neural network 220 being a specific kanji glyph neural network.

As mentioned above, the first font classification probability value 308 is 80% and the second font classification probability value 310 is 20%. As such, the font recognition system can weigh the first font probability vector values 304 by the first font classification probability value 308 for each of the fonts 302 to obtained a weighted first font probability vector (i.e., Font A: 0.95×0.80=0.76, Font B: 0.05×0.80=0.04, Font C: 0.0×0.80=0.0). Additionally, the font recognition system can weigh the second font probability vector values 306 by the second font classification probability value 310 for each of the fonts 302 to obtained a weighted second font probability vector (i.e., Font A: 0.40×0.20=0.08, Font B: 0.40×0.20=0.08, Font C: 0.20×0.20=0.04).

Further, the font recognition system can combine the first weighted font probability vector with the second weighted font probability vector for each of the fonts 302 to generate a hybrid font probability vector 252 having the hybrid font probability vector values 312 shown in the table 300 (i.e., Font A: 0.76+0.08=0.84, Font B: 0.04+0.08=0.12, Font C: 0.0+0.04=0.04). As shown, the hybrid font probability vector values 312 indicate that the input font best corresponds to Font A. In some embodiments, the font recognition system validates that the input font matches a known font with the font classification score is above a threshold value (e.g., 70%, 80%, 95%). In additional embodiments, the font recognition system presents the known font with the highest font classification score (e.g., Font A at 84%) from the hybrid font probability vector values 312 as the identified font 258. As a note, each of the font probability vectors sum to one for when combing the classification values for each of the fonts 302. One will appreciate that the numbers in FIG. 3 are provided to illustrate how hybrid font probability vector values are determined and are not actual experimental values.

Figure 4:
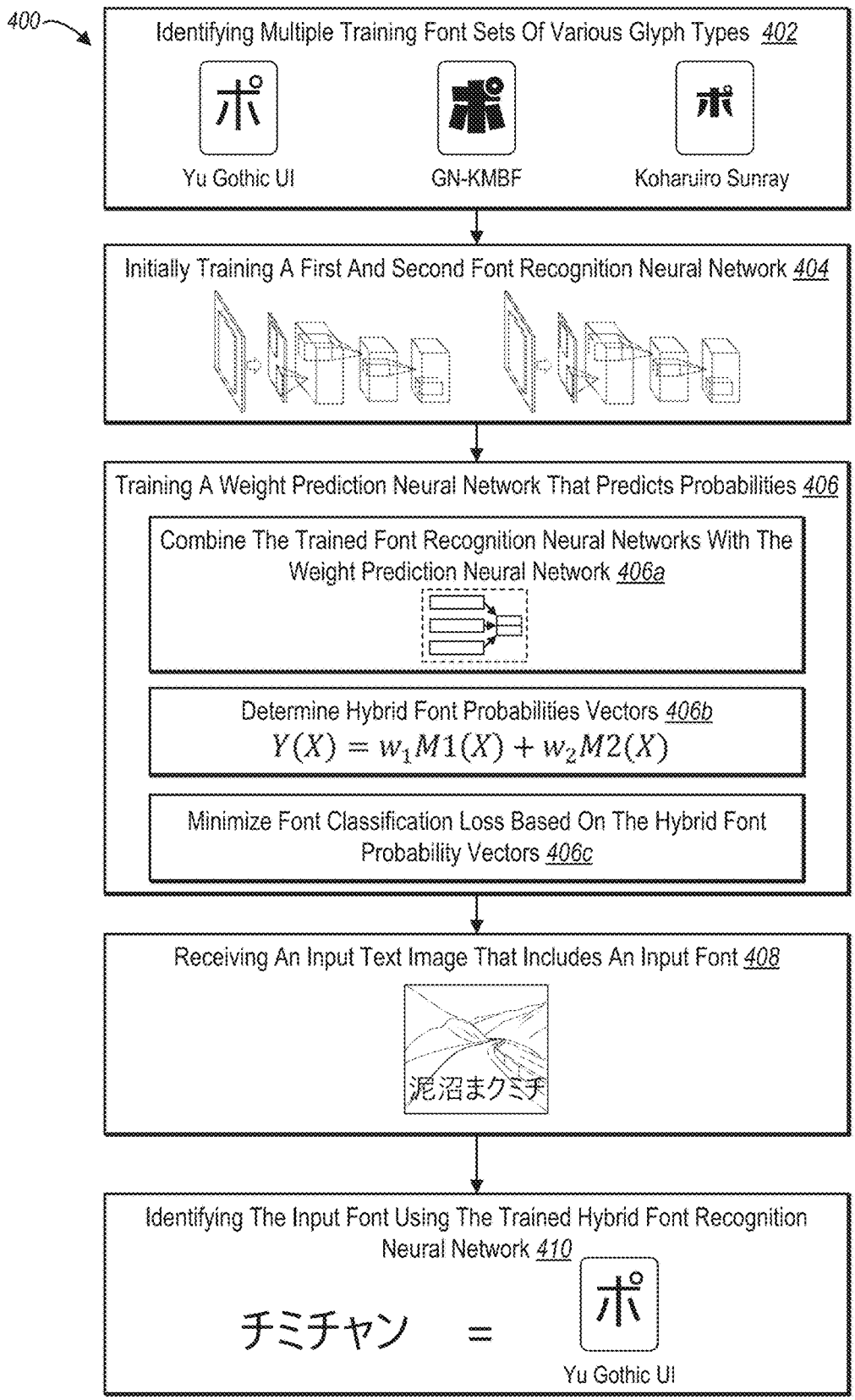
FIG. 4 illustrates acts in performing a step for training a weight prediction neural network that predicts a first font classification probability that the first trained font recognition neural network will output a better font classification for a given text image than the second trained font recognition neural network in accordance with one or more embodiments.

FIG. 4 illustrates a series of acts 400 in performing a step for training a weight prediction neural network that predicts a first font classification probability that the first trained font recognition neural network will output a better font classification for a given text image than the second trained font recognition neural network. In various embodiments, the font recognition system described herein performs the series of acts 400. In some embodiments, the font recognition system is implemented by a server device and performs one or more of the series of acts 400 in connection with a client device.

As shown, the series of acts 400 includes the font recognition system identifying 402 multiple training font sets of various glyph types. For example, the font recognition system accesses a font repository and identifies a number of Japanese fonts. The font recognition system can select some or all of the identified Japanese fonts. Further, the font recognition system selects a number of Japanese glyphs including both kana and kanji glyphs. In various embodiments, the font recognition system generates a training font set of text images using kana and kanji glyphs, generates a training font set of text images using only kana or kanji glyphs, generates a training font set of text images using glyphs in a language other than Japanese, and/or obtains one or more training font sets from a local or remote font database.

In addition, in some embodiments, the font recognition system associates metadata with each generated text image. For example, the font recognition system labels the font and the glyphs used in each text image. As described above, the font recognition system can use the metadata during training to determine accuracy and measure font classification error loss.

As also shown, the series of acts 400 includes the font recognition system initially training 404 first and second font recognition neural networks. As explained earlier, the font recognition system can separately train the first and second font recognition neural networks based on different training font sets. For instance, in one or more embodiments, the font recognition system employs a first training font set and a font classification loss model to train a first font recognition neural network (e.g., using about 20,000 iterations). Similarly, the font recognition system employs a second training font set and a font classification loss model to train a second font recognition neural network. Glyphs in the second training font set can be a subset of glyphs included in the first training font set. Alternatively, the first and second training font set can include separate glyph types, as previously described.

As mentioned previously, in various embodiments, the first and second font recognition neural networks are convolutional neural networks with lower convolutional layers and higher full-connected layers. For example, the first font recognition neural network generates feature vectors based on text images in the first training font set using tunable font feature extraction parameters (e.g., weight and biases). Further, the font recognition neural network generates font probability vectors based on tunable font classification parameters by comparing the generated feature vectors to feature vectors of known fonts. In alternative embodiments, the first font recognition neural network is a different type of neural network than the second font recognition neural network.

As shown, the series of acts 400 includes training 406 a weight prediction neural network that predicts probabilities. In particular, the font recognition system generates a weight prediction neural network that outputs prediction vectors. Each prediction vector includes font classification probabilities that indicate the probability that a font recognition neural network will better classify the font in a given text image than another font recognition neural network.

To train the weight prediction neural network, in one or more embodiments, the font recognition system employs a hybrid font recognition neural network. The hybrid font recognition neural network combines 406a the trained first and second font recognition neural networks with the weight prediction neural network. Then, using text images in a training font set and a single font classification loss model, the font recognition system trains the weight prediction neural network.

In various embodiments, the training text images employed to train the hybrid font recognition neural network are obtained from the training font set used to train the first and/or second font recognition neural networks. In alternative embodiments, the training font set includes unknown and unlabeled Japanese glyphs (e.g., both kanji and kana). The font recognition system can train the weight prediction neural network to make accurate predictions as to which font recognition neural network will best classify a given text image without this additional information.

As mentioned above, in one or more embodiments, the font recognition system determines 406b hybrid font probability vectors for each training image in the training font set. For instance, the font recognition system provides a copy of the training text image to the first font recognition neural network, the second font recognition neural network, and the weight prediction neural network. The first and the second font recognition neural networks output first and second font probability vectors, as described above, which individually classify a font for the font in the text image.

In addition, the weight prediction neural network outputs a prediction vector having font classification probabilities for the training text image. As described previously, because the weight prediction neural network is initially untrained, the first font classification probabilities assign default or random probabilities. As the weight prediction neural network trains, however, the weight prediction neural network learns which probabilities to dynamically assign to each font recognition neural network based on training text images.

To illustrate, for a given training text image, in some embodiments, the font recognition system generates a hybrid font probability vector based on Equation 1 below. As shown in Equation 1, Y corresponds to a hybrid font probability vector for input text image X. In addition, $w_1$ and $w_2$ correspond to the first and second font classification probabilities, respectively (e.g., Weight 1 and Weight 2). Further, M1 and M2 correspond to the first font probability vector of the font recognition neural network and the second font probability vector of the second font recognition neural network, respectfully (e.g., Model 1 and Model 2). Additionally, $w_1$ and $w_2$ range between zero and one (i.e., [0-1]) and together sum to one or approximately one. In other words, $w_2=(1.0-w_1)$.

$$Y(X)=w_1 M1(x)+w_2 M2(X) \quad (1)$$

As shown in Equation 1, the font recognition system determines a first weighted font probability vector by applying the first font classification probability (i.e., $w_1$) to the first font probability vector (i.e., M1) of the input text image (i.e., X). Similarly, the font recognition system determines a second weighted font probability vector by applying the second font classification probability (i.e., $w_2$) to the second font probability vector (i.e., M2) of the input text image (i.e., X). Then, the font recognition system combines the first and second weighted font probability vectors to form the hybrid font probability vector for the text image (i.e., Y(X)). FIG. 3 above, provides one numerical example of the font recognition system generating a hybrid font probability vector.

As shown in Equation 1, the font recognition system employs a linear combination (e.g., addition) between the first and second weighted font probability vectors to form the hybrid font probability vector. In alternative embodiments, the font recognition system employs different combination techniques to form the hybrid font probability vector by fusing the first and second weighted font probability vectors together.

In addition, to train the weight prediction neural network, the font recognition system minimizes 406c font classification loss based on the hybrid font probability vectors. In particular, the font recognition system provides hybrid font probability vectors to a single font classification loss model. In one or more embodiments, the font classification loss model is a softmax classifier that employs cross-entropy loss to tune the overall model in an end-to-end manner by conventional back propagation. For example, the font classification loss model employs mean square error (MSE) to determine the font classification loss.

In one or more embodiments, the font recognition system employs the font classification loss model to provide simultaneous feedback to the various neural networks within the hybrid font recognition neural network. For example, the font classification loss model provides the font classification error loss to the first and second font recognition neural networks to further train the font feature extraction parameters. Because the first and second font recognition neural networks were initially trained, the font classification loss model adopts a small learning rate (e.g., $1e^{-6}$), which fine-tunes the corresponding parameters. At the same time, the font classification loss model provides the font classification error loss to the weight prediction neural network to learn accurate font classification parameters. Because the weight prediction neural network is initially untrained, the font classification loss model adopts a large learning rate (e.g., $1e^{-3}$), which strongly (e.g., more coarsely and quickly) tunes the parameters of the weight prediction neural network.

To illustrate, the following is a conceptual example of how the font classification loss model uses font classification error loss to train the weight prediction neural network. The font recognition system provides a hybrid font probability vector to the font classification loss model. The hybrid font probability vector indicates that Font A is the identified font. The font classification loss model verifies if Font A is indeed the font used in the corresponding training text image. If the training text image includes Font A, then the font classification error loss is small and little or no feedback is provided back to the weight prediction neural network.

If, however, the training text image is not written in Font A (e.g., the training text image used Font B), the font classification loss model determines the vector space distance (e.g., error loss) between a feature vector for Font A from the hybrid font probability vector and the known feature vector for Font B. The font classification loss model applies the large learning rate (e.g., divides error loss by 0.001) and provides the modified error loss to the weight prediction neural network. From the error loss, the weight prediction neural network learns that it wrongly predicted the font classification probabilities and accordingly tunes the font classification parameters. The font recognition system repeats the process for the same training text image until the error loss starts to reduce. Additionally, or alternatively, the font recognition system repeats the process with different training text images in the training font set. Further, the process iteratively repeats until the total loss is minimized and the weight prediction neural network converges.

As shown in FIG. 4, the series of acts 400 includes receiving 408 an input text image that includes an input font (e.g., kanji, kana, or a mixture of both). For example, a user provides an image to the font recognition system that includes text written in an unknown input font in unknown glyphs. In some embodiments, the input text image can be a flat image file with no metadata and the font recognition system identifies an area of the input text image that includes the unknown input font. In another example, the font recognition system automatically receives the text input file with the input font, such as part of a batch operation to identify fonts in text images.

As shown in FIG. 4, the series of acts 400 includes identifying 410 the input font from the input text image using the font recognition neural network. For example, the font recognition system provides the input text image with the input font to the trained hybrid font recognition neural network. In response, the hybrid font recognition neural network determines a feature vector and a hybrid font probability vector for the input font. In addition, as explained earlier, the font recognition system identifies the input font from the hybrid font probability vector.

In one or more embodiments, the font recognition system identifies the input font on a server device. For example, a client device provides the input text image (or representative data) to the server device, and the server device provides the identified input font back to the client device. In alternative embodiments, the font recognition system resided, at least in part, on a client device and identifies feature vectors and/or font probability vectors for input text images (e.g., a server device provides the trained hybrid font recognition neural network to the client device).

Moreover, in one or more embodiments, the font recognition system functions in connection with an application to receive and identify the font in the input text image. For example, a user is using a word-processing or graphic design application and requests to use the font displayed in the input text image. In response, the font recognition system identifies the input font in the input text image using the hybrid font recognition neural network and provides the identified font back to the user within the application. Further, in some embodiments, the font recognition system also provides additional similar fonts, as described above.

Figure 5:
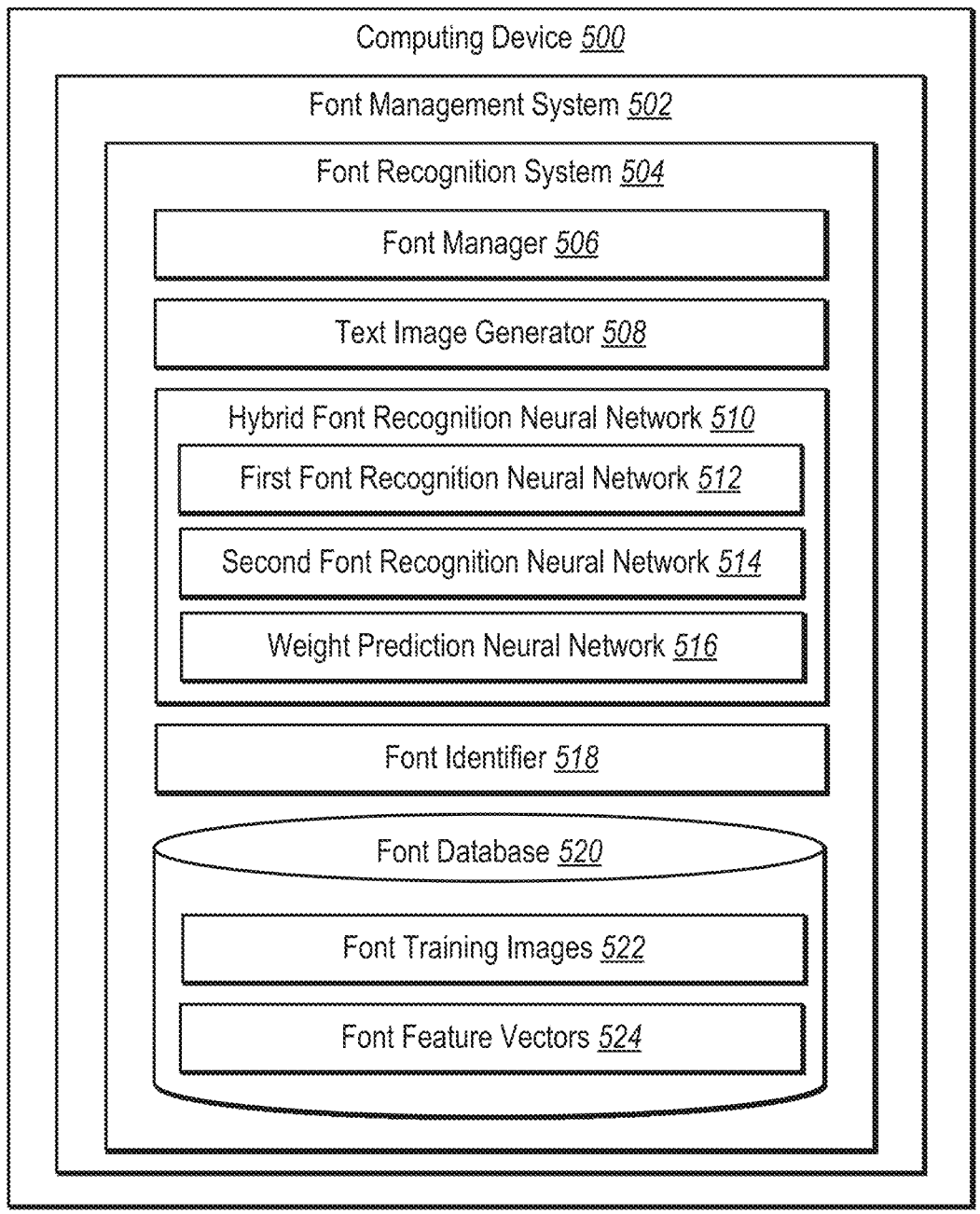
FIG. 5 illustrates a schematic diagram of a font recognition system in accordance with one or more embodiments.

Referring now to FIG. 5, additional detail will be provided regarding capabilities and components of the font recognition system in accordance with one or more embodiments. In particular, FIG. 5 shows a schematic diagram of an example architecture of the font recognition system 504 located within a font management system 502 and hosted on a computing device 500. The font recognition system 504 can represent one or more embodiments of the font recognition system described previously.

As shown, the font recognition system 504 is located on a computing device 500 within a font management system 502. In general, the computing device 500 may represent various types of client devices. For example, in some embodiments, the client is a mobile device, such as a mobile telephone, a smartphone, a PDA, a tablet, a laptop, etc. In other embodiments, the computing device 500 is a non-mobile device, such as a desktop or server, or another type of client device. In some embodiments, portions of the computing device 500 correspond to computing devices of different types (e.g., some components operate on the computing device 500 when acting as a server device and some components operate on the computing device 500 when acting as a client device). Additional details with regard to the computing device 500 are discussed below as well as with respect to FIG. 10.

The font management system 502, in general, facilitates the creation, modification, sharing, installation, and/or deletion of digital fonts within electronic documents and/or system applications. For example, the font management system 502 stores a repository of fonts on the computing device 500, such as in the font database 520. In addition, the font management system 502 can access additional fonts located remotely. Further, in some embodiments, the font management system 502 can be located separately from the computing device 500 and provide fonts to the computing device 500. In one or more embodiments, the font management system 502 comprises ADOBE® TYPEKIT®.

In addition, the font management system 502 can operate in connection with one or more applications to display fonts on the computing device 500. For example, in one or more embodiments, the font management system 502 provides fonts to a word processing application such as ADOBE® ACROBAT®, ADOBE® INDESIGN®, or another word processing application. In other embodiments, the font management system 502 provides fonts to a design application such as ADOBE® ILLUSTRATOR®.

As illustrated in FIG. 5, the font recognition system 504 includes various components. For example, the font recognition system 504 includes a font manager 506; a text image generator 508; a hybrid font recognition neural network 510 that includes a first font recognition neural network 512, a second font recognition neural network 514, and weight prediction neural network 516; a font identifier 518; and a font database 520 that includes font training images 522 and font feature vectors 524. Each of these components is described below in turn.

The font manager 506 can store, receive, detect, install, order, and/or organize fonts within the computing device 500. For example, in one or more embodiments, the font manager 506 stores a set of fonts on the computing device 500. In some embodiments, the font manager 506, in connection with the font management system 502, maintains fonts within the font database 520. For example, the font manager 506 maintains a set of fonts (e.g., Japanese fonts and fonts of other languages) that a user can employ in an electronic document. In an additional example, the font manager 506 maintains the font training images 522 (e.g., sets of labeled and unlabeled text images of various glyphs). In various embodiments, the font manager 506 can identify and access additional fonts not stored or located on the computing device 500. For instance, the font manager 506 maintains fonts on the computing device 500 corresponding to multiple languages.

The text image generator 508 can generate sets of text images used to train the hybrid font recognition neural network 510. For example, the text image generator 508 renders sets of text images from randomly selected fonts and glyphs (e.g., kanji glyphs only, kana glyphs only, kanji and kana glyphs, other language glyphs), as previously described. In some embodiments, the text image generator 508 stores generated text images in the font database 520 as a font training images 522. Further, the text image generator 508 can label, tag, or otherwise annotate various sets of text image used in training, as explained earlier.

As shown in FIG. 5, the font recognition system 504 includes the hybrid font recognition neural network 510. The hybrid font recognition neural network 510 includes the first font recognition neural network 512, the second font recognition neural network 514, and the weight prediction neural network 516. Each of the neural networks can include lower convolutional layers and higher fully-connected layers as well as loss layers during training.

In some embodiments, the convolutional layers encoder feature vectors (e.g., font feature vectors and/or font classification feature vectors) based on input text images. In addition, the convolutional layers can include one or more normalizing and pooling layers to generate the feature vectors. In one or more embodiments, the higher layers analyze and classify the generated feature vectors. For example, the first font recognition neural network 512 and the second font recognition neural network 514 include font classifiers that output multi-dimensional font probability vectors, as described above. In addition, the weight prediction neural network can include a font classification classifier that outputs a two-dimensional prediction vector that includes font classification probabilities, as explained earlier.

In one or more embodiments, the font recognition system 504 trains the hybrid font recognition neural network 510 based on a hybrid font probability vector. As explained above, the font recognition system 504 combines the font probability vectors from the first font recognition neural network 512 and the second font recognition neural network 514 along with the font classification probabilities from the weight prediction neural network to form a hybrid font probability vector. Based on the hybrid font probability vector, the font recognition system 504 can train the hybrid font recognition neural network 510 and identify fonts.

As mentioned above, in various embodiments, the neural networks include loss layers during training. For example, the first font recognition neural network 512 and the second font recognition neural network 514 each employ a font classification loss model when initially training. In addition, the hybrid font recognition neural network 510 employs a single font classification loss model to train based on the hybrid font probability vector, as described previously. In each case, a neural network can use a font classification loss model to iteratively train and minimize font classification error loss.

The trained hybrid font recognition neural network 510 can provide a hybrid font probability vector that identifies that font in an input text image. For example, for an input text image, the trained hybrid font recognition neural network 510 generates two font probability vectors using the first font recognition neural network 512 and the second font recognition neural network 514. Each of the font recognition neural networks can create the font probability vectors by comparing the generated font feature vector to font feature vectors 524 of known fonts (e.g., stored in the font database 520). In addition, the trained hybrid font recognition neural network 510 generates a prediction vector that includes first and second font classification probabilities, which indicates that the first/second font recognition neural network will output a better font classification for an input digital font than the second/first font recognition neural network. Based on the font probability vectors and font classification probabilities, the font recognition system 504 generates the hybrid font probability vector, as described above.

As shown, the font recognition system 504 includes the font identifier 518. The font identifier 518 can receive input fonts within input text images and identify the input font using the trained hybrid font recognition neural network 510. In particular, the font identifier 518 provides input text images to the hybrid font recognition neural network 510 and identifies the font in the input text image based on an outputted hybrid font probability vector. Further, the font identifier 518 provides the identified font, for example, to the user that submitted the input text image.

Each of the components 506-524 of the font recognition system 504 can include software, hardware, or both. For example, the components 506-524 can include one or more instructions stored on a computer-readable storage medium and executable by processors of one or more computing devices, such as a client device or server device. When executed by the one or more processors, the computer-executable instructions of the font recognition system 504 can cause the computing device(s) to perform the feature learning methods described herein. Alternatively, the components 506-524 can include hardware, such as a special-purpose processing device to perform a certain function or group of functions. Alternatively, the components 506-524 of the font recognition system 504 can include a combination of computer-executable instructions and hardware.

Furthermore, the components 506-524 of the font recognition system 504 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 506-524 may be implemented as a stand-alone application, such as a desktop or mobile application. Furthermore, the components 506-524 may be implemented as one or more web-based applications hosted on a remote server. The components 506-524 may also be implemented in a suite of mobile device applications or "apps." To illustrate, the components 506-524 may be implemented in an application, including but not limited to ADOBE® TYPEKIT®, ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

Figure 6:
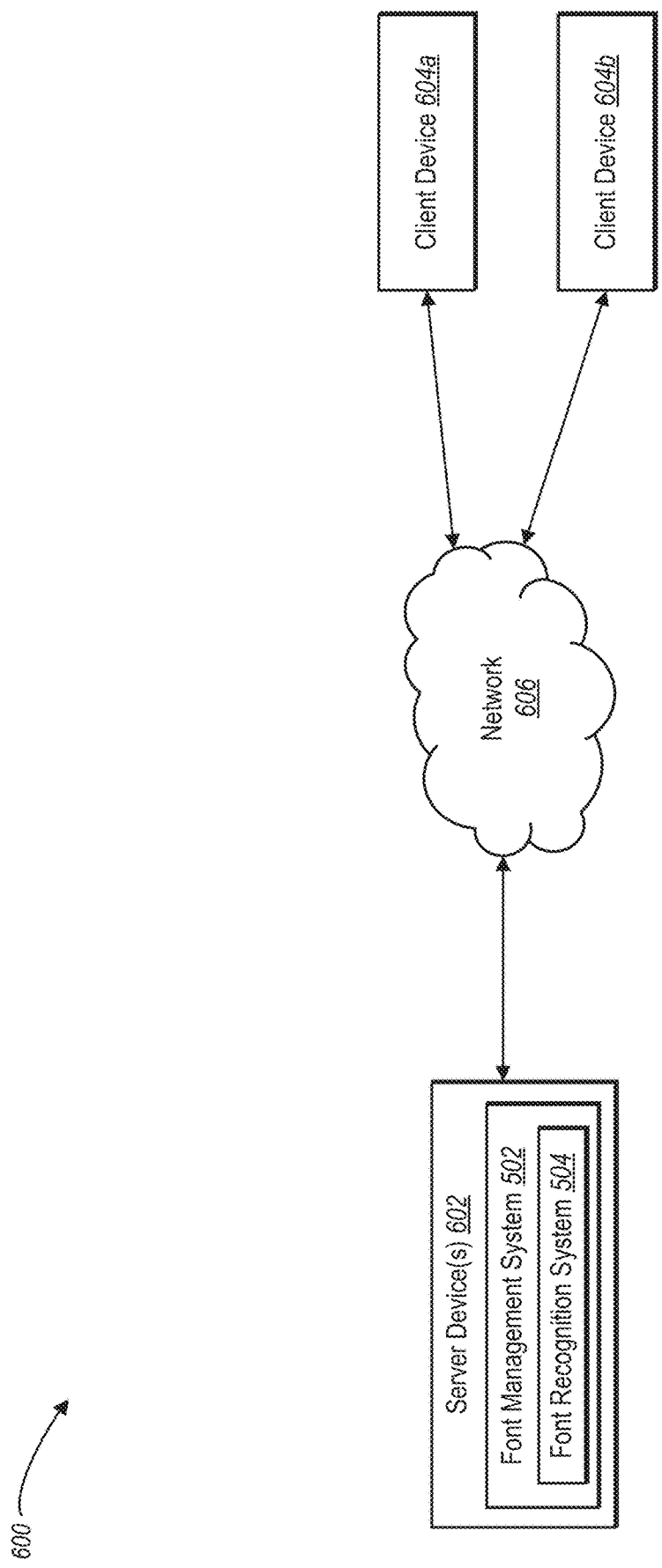
FIG. 6 illustrates a schematic diagram of an exemplary environment in which the font recognition system may be implemented in accordance with one or more embodiments.

FIG. 6 illustrates a schematic diagram of an environment 600 in which the font recognition system 504 may be implemented in accordance with one or more embodiments. In one or more embodiments, the environment 600 includes various computing devices including server device(s) 602 and one or more client devices 604a, 604b. In addition, the environment 600 includes a network 606. The network 606 may be any suitable network over which the computing devices can communicate. Example networks are discussed in more detail below with regard to FIG. 10.

As illustrated in FIG. 6, the environment 600 includes the server device(s) 602, which may comprise any computing device, such as one or more of the computing devices described below in relation to FIG. 10. In addition, the server device(s) 602 includes the font management system 502 and the font recognition system 504, which are described previously. For example, as described above, the font recognition system 504 can train and apply a hybrid font recognition neural network to accurately identify a font (e.g., Japanese font) used in a text image.

In addition, the environment 600 includes the one or more client devices 604a, 604b. The client devices 604a, 604b may comprise any computing device, such as the computing device described below in relation to FIG. 10. As described above, the one or more client devices 604a, 604b can employ the trained hybrid font recognition neural network to identify a font within an input text image.

As illustrated, in one or more embodiments, the server device(s) 602 can include all, or a portion of, the font recognition system 504. In particular, the font recognition system 504 can comprise an application running on the server device(s) 602 or a portion of a software application that can be downloaded from the server device(s) 602. For example, the font recognition system 504 can include a web hosting application that allows a client device 604a to interact with content hosted on the server device(s) 602. To illustrate, in one or more embodiments of the environment 600, the client device 604a accesses a web page supported by the server device(s) 602. In particular, the client device 604a can run an application to allow a user to access, view, select, and/or identify a font from a text image within a web page or website hosted at the server device(s) 602 (e.g., a web page enables a user to provide a text image that includes input font, and receive, from the sure, identification of the input font).

Although FIG. 6 illustrates a particular arrangement of the server device(s) 602, the client devices 604a, 604b and the network 606, various additional arrangements are possible. For example, while FIG. 6 illustrates the one or more client devices 604a, 604b communicating with the server device(s) 602 via the network 606, in one or more embodiments a single client device may communicate directly with the server device(s) 602, bypassing the network 606.

Similarly, although the environment 600 of FIG. 6 is depicted as having various components, the environment 600 may have additional or alternative components. For example, the font recognition system 504 can be implemented on multiple computing devices. In particular, the font recognition system 504 may be implemented in whole by the server device(s) 602 or the font recognition system 504 may be implemented in whole by the client device 604a. Alternatively, the font recognition system 504 may be implemented across multiple devices or components (e.g., utilizing the server device(s) 602 and the one or more client devices 604a, 604b).

Figure 7B:
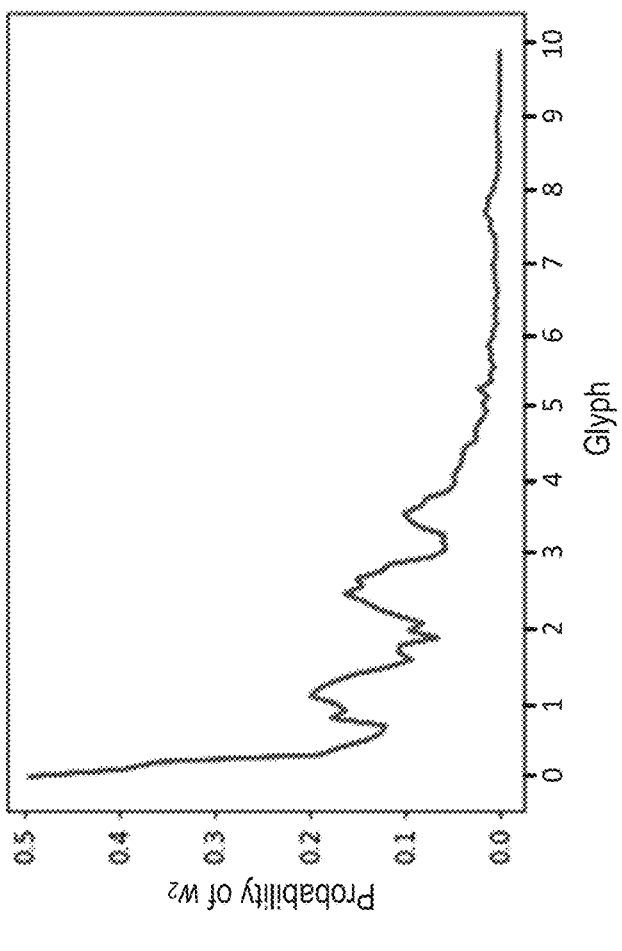
FIG. 7B illustrates a chart showing the hybrid font recognition neural network determining dynamic weighting glyphs in the same input text image of FIG. 7A in accordance with one or more embodiments.
Figure 7A:
FIG. 7A illustrates a sample input text image that includes multiple glyphs of different glyph types.

Turning now to FIGS. 7A and 7B, additional detail is provided with respect to training and evaluating the embodiments of the font recognition system. In particular, FIG. 7A illustrates a sample input text image that includes multiple glyphs of different glyph types. FIG. 7B illustrates a chart showing the hybrid font recognition neural network determining dynamic weights for glyphs in the input text image of FIG. 7A in accordance with one or more embodiments.

FIG. 7A shows an input text image 710 used to test a trained hybrid font recognition neural network. The input text image 710 includes ten Japanese glyphs. The glyphs include a mixture of kanji and kana glyphs. For example, glyphs 1-4 are kanji and glyphs 5-10 are kana. The input text image 710 includes a mixture of kanji and kana glyphs because it is can be common in Japanese writing to use both kanji and kana glyphs in the same sentence.

Upon providing the input text image 710 to the trained hybrid font recognition neural network, the font recognition system crops the input text image 710 into multiple square patches (e.g., smaller images). As previously mentioned, the font recognition system can crop an input text image into multiple smaller images where each image includes one or more glyphs. In some embodiments, the font recognition system provides one of the cropped images to the trained hybrid font recognition neural network to identify the font in the image. In additional embodiments, the font recognition system provides additional cropped images to the trained hybrid font recognition neural network for further font recognition validation and/or testing, as explained earlier.

For testing purposes, the input text image 710 is cropped into ten smaller images where each image includes a glyph. Each of the ten images were provided to a trained hybrid font recognition neural network that included a generic font recognition neural network trained on a combination of kanji and kana glyphs and a specific font recognition neural network trained using kanji glyphs. For each of the ten images, the trained hybrid font recognition neural network (e.g., the weight prediction neural network) outputs a prediction vector that includes a first font classification probability (e.g., $w_1$) and a second font classification probability (i.e., $w_2$). As described above, the second font classification probability indicates the predicted probability that the specific font recognition neural network will output a better font classification for an input text image than the generic font recognition neural network.

FIG. 7B illustrates a chart 720 showing the second or font classification probability (i.e., $w_2$) for each of the ten images corresponding to the specific font recognition neural network. As shown, the weight prediction neural network of the trained hybrid font recognition neural network predicts larger $w_2$ predictive weights (i.e., font classification probabilities) for images that include kanji glyphs (e.g., glyphs 1-4). Indeed, the trained hybrid font recognition neural network predicts greater $w_2$ predictive weights to the kanji-specific font recognition neural network over the generic font recognition neural network for kanji glyphs (e.g., glyphs 1-4).

Similarly, while $w_1$ is not shown in a separate chart, when $w_2$ is low, $w_1$ is high (i.e., $w_2=1.0-w_1$). Accordingly, the trained hybrid font recognition neural network predicts greater $w_1$ weights to the generic font recognition neural network over the kanji-specific font recognition neural network for non-kanji glyphs (e.g., glyphs 5-10). Thus, FIG. 7B indicates that the font recognition system assigns a large predictive weight to the kanji-specific for images that include kanji glyphs and vice versa for images without kanji glyphs.

In addition, researchers evaluated the trained hybrid font recognition neural network described herein against state-of-the-art font classification systems. In particular, the researchers evaluated the effectiveness of the hybrid model (e.g., the trained hybrid font recognition neural network) by measuring the accuracy percentage of test data (e.g., testing text images) that correctly classified (e.g., identified the correct font). In addition, the researchers tested the same text data on a state-of-the-art font classification systems that was trained on both kanji and kana glyphs (i.e., Generic Model) and a state-of-the-art font classification systems that was trained on kanji glyphs (i.e., Kanji-Specific Model). Table 1 below shows the average accuracy results.

TABLE 1

| Models | Overall Accuracy | Kana Accuracy | Kanji Accuracy |
| --- | --- | --- | --- |
| Generic Model | 89.19% | 90.77% | 82.65% |
| Kanji-Specific Model | — | — | 90.42% |
| Hybrid Model | 90.15% | 90.38% | 90.06% |

As shown in Table 1, the overall recognition accuracy with the Generic Model is 89.19%, while the accuracy of text images of kanji glyphs provided during testing to the Generic Model is 82.65%. For Kanji-Specific Model, the accuracy of text images of kanji glyphs provided during testing is 90.42%, which is much higher than the Generic Model. With respect to the Hybrid Model (shown in bold), the Hybrid Model improves the overall accuracy by around 1%. Further, the Hybrid Model outperforms the Generic Model for text images of kanji glyphs by over 7%. (i.e., Hybrid Model: 90.06%), a result that is equivalent to the performance achieved by the Kanji-Specific Model (i.e., 90.42%) when tested with only kanji glyphs.

These results are significant because, as mentioned above, Japanese text often employs both kanji and kana glyphs in the same string of words. Thus, input text images of a Japanese text include unknown glyph types. Indeed, these input text images are not pre-sorted or recognized into kanji and kana specific groupings. Thus, the Kanji-Specific Model cannot classify images of kana glyphs, and the performance of the Generic Model is inferior to the Hybrid Model disclosed herein.

As a further note, the results in Table 1 describe a comparison between the font recognition system described herein and a state-of-the-art font classification system. When compared to conventional font classification systems, the font recognition system described herein further outperforms these conventional systems in each category tested. As mentioned above, conventional systems poorly perform font classification with fonts that includes intra-class variances, such as Japanese fonts.

FIGS. 1-7B, the corresponding text, and the examples provide a number of different methods, systems, devices, and non-transitory computer-readable media of the font recognition system. In addition to the foregoing, one or more embodiments can also be described in terms of flowcharts comprising acts for accomplishing a particular result. For example, FIG. 8 and FIG. 9 may be performed with more or fewer acts. Further, the acts may be performed in differing orders. Additionally, the acts described herein may be repeated or performed in parallel with one another or parallel with different instances of the same or similar acts.

Figure 8:
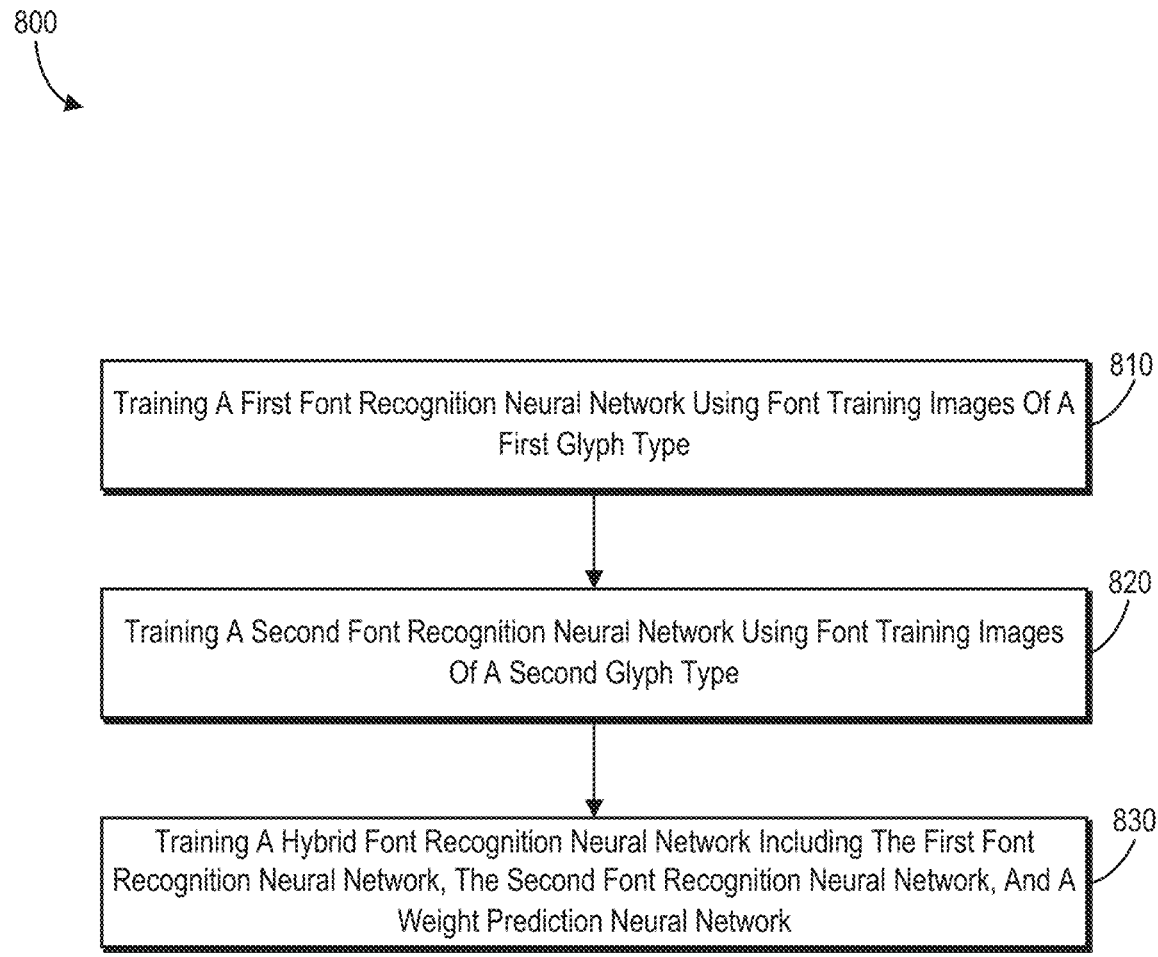
FIG. 8 illustrates a flowchart of a series of acts for training a hybrid font recognition neural network to classify digital fonts using a weight prediction neural network in accordance with one or more embodiments.

As mentioned, FIG. 8 illustrates a flowchart of a series of acts 800 for training a hybrid font recognition neural network to classify digital fonts using a weight prediction neural network in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method.

Alternatively, a non-transitory computer-readable medium can comprise instructions that, when executed by one or more processors, cause a computing device to perform the acts of FIG. 8. In some embodiments, a system can perform the acts of FIG. 8.

In one or more embodiments, the series of acts 800 is implemented on one or more computing devices, such as the computing device 500 or the server device(s) 602. In addition, in some embodiments, the series of acts 800 is implemented in a digital environment for creating or editing electronic documents. For example, the series of acts 800 is implemented on a computing device having a memory that stores digital fonts and glyphs. For instance, the memory stores a first set of font training images of a first glyph type, and a second set of font training images of a second glyph type. In some embodiments, the digital fonts are Japanese fonts, and the glyphs are Japanese glyphs.

The series of acts 800 includes an act 810 of training a first font recognition neural network using font training images of a first glyph type. In particular, the act 810 can involve training a first font recognition neural network to classify digital fonts using the first plurality of font training images including the first glyph type. In some embodiments, the first plurality of font training images includes both the first glyph type (e.g., Japanese kana glyphs) and the second glyph type (e.g., Japanese kanji glyphs).

As shown, the series of acts 800 also includes an act 820 of training a second font recognition neural network using font training images of a second glyph type. In particular, the act 820 can involve training a second font recognition neural network to classify the digital fonts using the second plurality of font training images including the second glyph type. In some embodiments, the second plurality of font training images does not include the first glyph type. In additional embodiments, the first plurality of font training images is generated separately from the second plurality of font training images.

In various embodiments, the first and/or second font recognition neural networks generate a multi-dimensional probability vector corresponding to the number of fonts seen in the first and/or second plurality of font training images. In addition, in some embodiments, the first and/or second font recognition neural networks are convolutional neural networks that include convolutional layers and fully-connected layers. In some embodiments, the convolutional layers include a font encoder that outputs font feature vectors based on font feature extraction parameters. In various embodiments, the fully-connected layers include a font classifier that classifies digital fonts based on the font feature vectors (e.g., by comparing the feature vector for an input font to feature vectors of known fonts) and outputs a font probability vector.

As shown in FIG. 8, the series of acts 800 further includes an act 830 of training a hybrid font recognition neural network that includes the first font recognition neural network, the second font recognition neural network, and a weight prediction neural network. In one or more embodiments, the act 830 includes the weight prediction neural network predicting a first font classification probability that the first font recognition neural network will output a better font classification for an input digital font than the second font recognition neural network. In additional embodiments, the weight prediction neural network predicting a second font classification probability that the second font recognition neural network will output a better font classification for the input digital font than the first font recognition neural network.

In some embodiments, the act 830 includes providing copies of a training image that includes the input digital font to the first font recognition neural network, the second font recognition neural network, and weight prediction neural network. In addition, the act 830 can include weighting a first font probability vector generated by the first font recognition neural network for the input digital font based on the first font classification probability, weighting a second font probability vector generated by the second font recognition neural network for the input digital font based on a second font classification probability, and minimizing cross-entropy font classification loss of a hybrid font probability vector that includes the first weighted font probability vector and the second weighted font probability vector. In various embodiments, the hybrid font recognition neural network is trained using a single cross-entropy softmax loss function.

Further, in additional embodiments, the act 830 can also include providing the cross-entropy font classification loss as error loss feedback via back propagation to the first font recognition neural network, the second font recognition neural network, and the weight prediction neural network. In various embodiments, the error loss feedback is provided to the first font recognition neural network and the second font recognition neural network at a small learning rate. In some embodiments, the error loss feedback is provided to the weight prediction neural network at a large learning rate.

In one or more embodiments, the weighting prediction neural network outputs a two-dimensional prediction vector that includes the first font classification probability and the second font classification probability, where the first font classification probability and the second font classification probability are each between zero and one, and/or the first font classification probability and the second font classification probability sum to one.

The series of acts 800 can also include a number of additional acts. In one or more embodiments, the series of acts 800 includes the acts of training a third font recognition neural network to classify digital fonts using a third plurality of font training images including a third glyph type and further training the hybrid font recognition neural network based on the third font recognition neural network. In some embodiments, the weight prediction neural network predicts probabilities for each of the font recognition neural networks (e.g., first, second, and third) that sum to one or 100%.

In one or more embodiments, the series of acts 800 includes the acts of receiving an input text image including an input digital font, generating a hybrid font probability vector for the input digital font using the trained hybrid font recognition neural network, identifying the input digital font from a plurality of known digital fonts based on the hybrid font probability vector of the input digital font, and presenting the identified input digital font.

Figure 9:
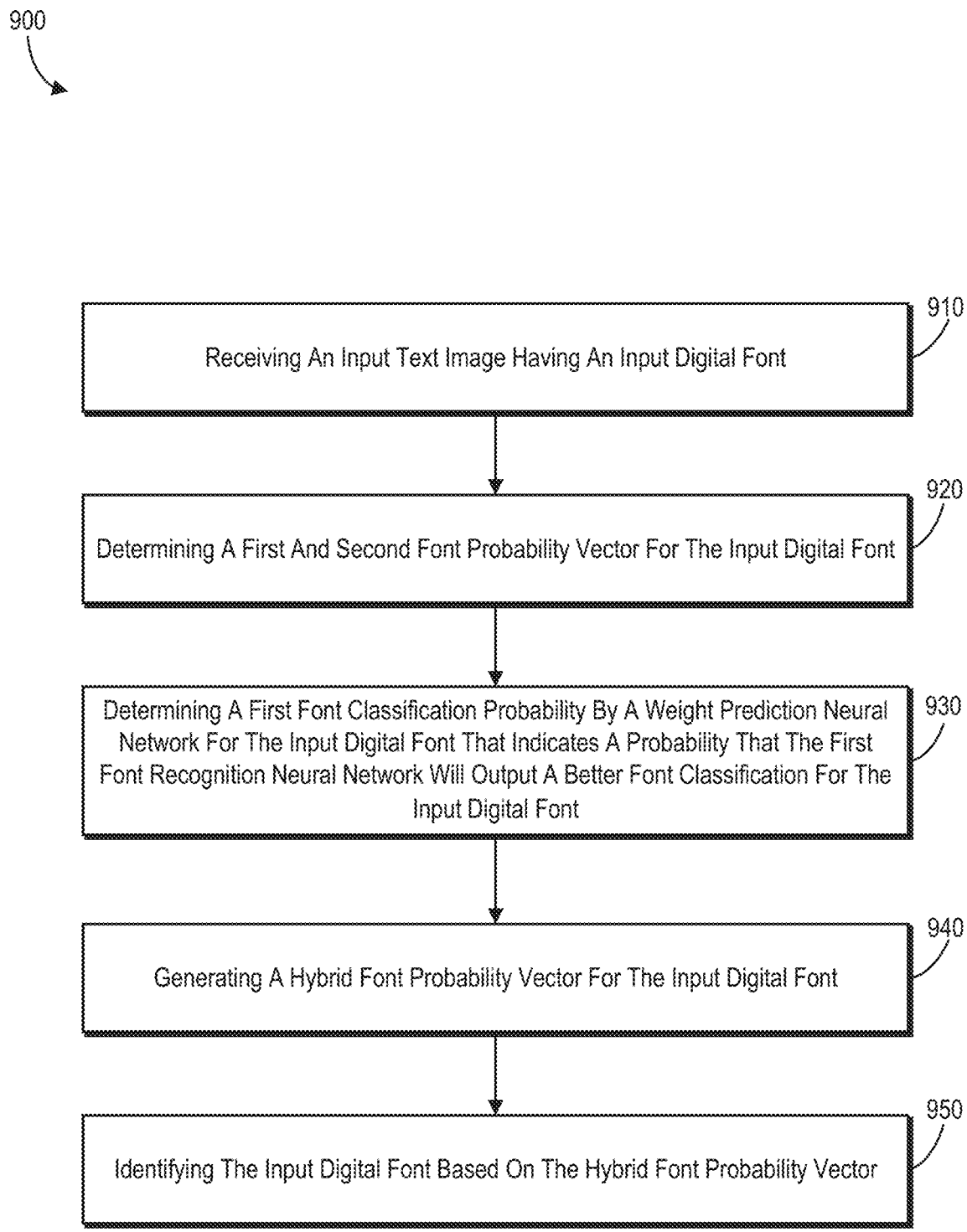
FIG. 9 illustrates a flowchart of a series of acts for identifying an input font in an input text image using the trained hybrid weighted font recognition neural network in accordance with one or more embodiments.

As mentioned previously, FIG. 9 illustrates a flowchart of a series of acts 900 for identifying an input font in an input text image using the trained hybrid weighted font recognition neural network in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In one or more embodiments, a system can perform the acts of FIG. 9. In some embodiments, the series of acts 900 is implemented by a computing system on one or more computing devices, such as the computing device 500 or the server device(s) 602.

As shown, the series of acts 900 includes an act 910 of receiving an input text image having an input digital font. In one or more embodiments, the act 910 includes receiving the input text image from a user and/or an application. In some embodiments, the input digital font and known digital fonts, described below, include Japanese kanji and/or kana glyphs.

The series of acts 900 also includes an act 920 of determining a first and second font probability vector for the input digital font. In particular, the act 920 includes determining a first font probability vector for the input digital font by a first trained font recognition neural network trained using a first plurality of font training images including a first glyph type. In addition, the act 920 includes determining a second font probability vector for the input digital font by a second trained font recognition neural network trained using a second plurality of font training images including a second glyph type.

As shown, the series of acts 900 includes an act 930 of determining a first font classification probability by a weight prediction neural network for the input digital font that indicates a probability that the first font recognition neural network will output a better font classification for the input digital font. In particular, the act 930 includes determining a first font classification probability for the first font recognition neural network by a weight prediction neural network and for the input digital font, where the first font classification probability includes a probability that the first font recognition neural network will output a better font classification for the input digital font than the second font recognition neural network.

In addition, the series of acts 900 includes an act 940 of generating a hybrid font probability vector for the input digital font. In particular, the act 940 can involve generating a hybrid font probability vector for the input digital font based on the first font probability vector, the first font classification probability, the second font probability vector, and a second font classification probability. In some embodiments, the act 940 includes weighting, based on the first font classification probability, a first font probability vector generated by the first font recognition neural network for the input text image; weighting, based on the second font classification probability, a second font probability vector generated by the second font recognition neural network for the input text image; and combining the first weighted font probability vector and the second weighted font probability vector. In one or more embodiments, the second font classification probability is one minus the first font classification probability.

As shown, the series of acts 900 also includes an act 950 of identifying the input digital font based on the hybrid font probability vector. In particular, the act 950 includes identifying the input digital font from a plurality of known fonts based on the hybrid font probability vector. In some embodiments, the act 950 also includes presenting the identified input digital font to a user.

The series of acts 900 can also include a number of additional acts. In one or more embodiments, the series of acts 900 includes the act of identifying multiple glyphs in the input text image written in the input digital font, cropping an identified glyph from the multiple identified glyphs, and providing the cropped identified glyph written in the input digital font to the font recognition neural network, the second font recognition neural network, and the weight prediction neural network. In various embodiments, the input text image includes glyphs not included in a training font set associated with the known digital fonts.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the font recognition system to train and employ a hybrid font recognition neural network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
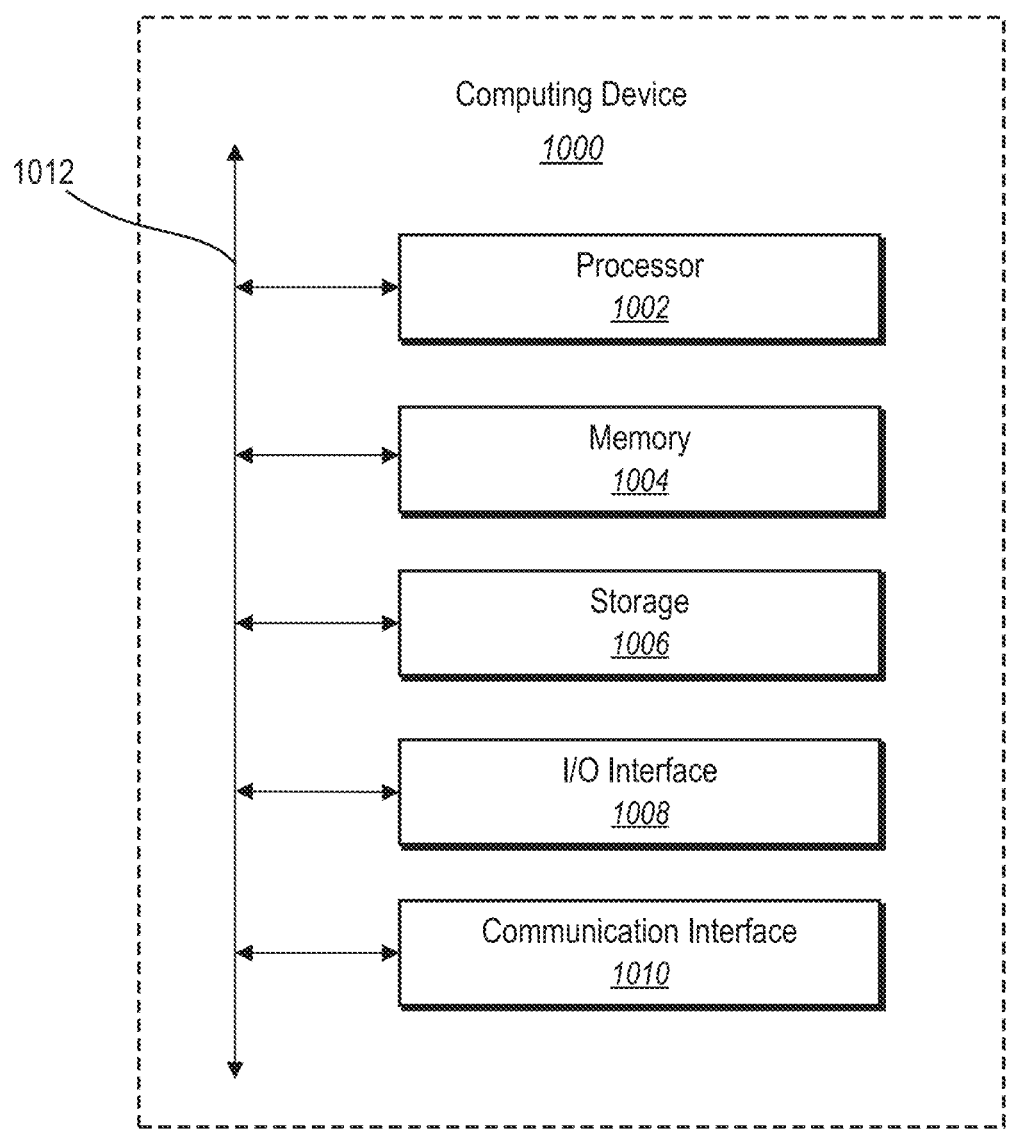
FIG. 10 illustrates a block diagram of an exemplary computing device for implementing one or more embodiments of the present disclosure.

FIG. 10 illustrates a block diagram of an exemplary computing device 1000 that may be configured to perform one or more of the processes described above. One will appreciate that one or more computing devices, such as the computing device 1000 may represent the computing devices described above (e.g., computing device 500, server device(s) 602, and client devices 604a-b). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system for training a neural network to classify digital fonts comprising:
   a memory comprising:
   a first plurality of font training images comprising a first glyph type; and
   a second plurality of font training images comprising a second glyph type;
   at least one processor; and
   at least one non-transitory computer-readable storage medium storing instructions that, when executed by the at least one processor, cause the system to:
   train a first font recognition neural network to classify digital fonts using the first plurality of font training images comprising the first glyph type;
   train a second font recognition neural network to classify the digital fonts using the second plurality of font training images comprising the second glyph type; and
   train a hybrid font recognition neural network comprising the first font recognition neural network, the second font recognition neural network, and a weight prediction neural network to combine outputs of the first and second font recognition neural networks.

2. The system of claim 1, wherein:
   the first plurality of font training images further comprises the second glyph type;
   the second plurality of font training images does not comprise the first glyph type; and
   the first plurality of font training images is generated separately from the second plurality of font training images.

3. The system of claim 1, wherein the instructions, when executed by the at least one processor, further cause the system to train the hybrid font recognition neural network by providing a training image comprising an input digital font to the first font recognition neural network, the second font recognition neural network, and weight prediction neural network.

4. The system of claim 3, wherein the instructions when executed by the at least one processor, further cause the system to train the hybrid font recognition neural network by:
   weighting, based on a first font classification probability, a first font probability vector generated by the first font recognition neural network for the input digital font;
   weighting, based on a second font classification probability, a second font probability vector generated by the second font recognition neural network for the input digital font; and
   minimizing cross-entropy font classification loss of a hybrid font probability vector that comprises the first weighted font probability vector and the second weighted font probability vector.

5. The system of claim 4, wherein the instructions when executed by the at least one processor, further cause the system to train the hybrid font recognition neural network by providing the cross-entropy font classification loss as error loss feedback via back propagation to the first font recognition neural network, the second font recognition neural network, and the weight prediction neural network, wherein:
   the error loss feedback is provided to the first font recognition neural network and the second font recognition neural network at a small learning rate; and
   the error loss feedback is provided to the weight prediction neural network at a large learning rate.

6. The system of claim 1, wherein:
   the weighting prediction neural network outputs a two-dimensional prediction vector that comprises a first font classification probability and a second font classification probability;
   the first font classification probability and the second font classification probability are each between zero and one; and
   the first font classification probability and the second font classification probability sum to one.

7. The system of claim 1, wherein the first font recognition neural network generates a multi-dimensional probability vector corresponding to a number of fonts seen in the first plurality of font training images.

8. The system of claim 1, further comprising instructions that when executed by the at least one processor that cause the system to:
   train a third font recognition neural network to classify digital fonts using a third plurality of font training images comprising a third glyph type; and
   further train the hybrid font recognition neural network based on the third font recognition neural network, wherein the weight prediction neural network predicts probabilities for the first font recognition neural network, the second font recognition neural network, and the third font recognition neural network that sum to one.

9. The system of claim 1, wherein:
the first font recognition neural network is a convolutional neural network; and
the hybrid font recognition neural network, comprising the first font recognition neural network, the second font recognition neural network, and the weight prediction neural network, is trained using a single cross-entropy softmax loss function.

10. The system of claim 1, further comprising instructions that, when executed by the at least one processor, cause the system to:
receive an input text image comprising an input digital font;
generate a hybrid font probability vector for the input digital font using the trained hybrid font recognition neural network;
identify the input digital font from a plurality of known digital fonts based on the hybrid font probability vector of the input digital font; and
present the identified input digital font.

11. A non-transitory computer-readable medium storing instructions that, when executed by at least one processor, cause a computer system to:
receive an input text image comprising an input digital font;
determine a first font probability vector for the input digital font, wherein the first font probability vector is determined using a first font recognition neural network trained with a first plurality of font training images comprising a first glyph type;
determine a second font probability vector for the input digital font, wherein the second font probability vector is determined using a second font recognition neural network trained with a second plurality of font training images comprising a second glyph type;
generate a hybrid font probability vector for the input digital font based on the first font probability vector, the second font probability vector, and one or more font classification probabilities; and
identify the input digital font from a plurality of known fonts based on the hybrid font probability vector.

12. The non-transitory computer-readable medium of claim 11, wherein the instructions that cause the computer system to generate the hybrid font probability vector for the input digital font by:
weighting, based on a first font classification probability, the first font probability vector generated by the first font recognition neural network for the input text image;
weighting, based on a second font classification probability, the second font probability vector generated by the second font recognition neural network for the input text image; and
combining the first weighted font probability vector and the second weighted font probability vector.

13. The non-transitory computer-readable medium of claim 12, wherein the second font classification probability comprises one minus the first font classification probability.

14. The non-transitory computer-readable medium of claim 11, further comprising instructions that cause the computer system to:
identify multiple glyphs in the input text image written in the input digital font;
crop an identified glyph from the multiple identified glyphs; and
provide the cropped identified glyph written in the input digital font to the font recognition neural network, the second font recognition neural network, and a weight prediction neural network that generates the one or more font classification probabilities.

15. The non-transitory computer-readable medium of claim 11, wherein the input digital font comprises a Japanese digital font.

16. In a digital medium environment for creating or editing electronic documents, a computer-implemented method of searching for and identifying images of digital fonts, comprising:
identifying a plurality of training font sets comprising text images, each training font set comprising a different glyph type;
training a first font recognition neural network to classify digital fonts using a first plurality of font training images comprising a first glyph type;
training a second font recognition neural network to classify digital fonts using a second plurality of font training images comprising a second glyph type; and
performing a step for training a weight prediction neural network that predicts a first font classification probability that the first trained font recognition neural network will output a better font classification for a given text image than the second trained font recognition neural network.

17. The method of claim 16, further comprising combining the first font recognition neural network, the second font recognition neural network, and the weight prediction neural network into a hybrid font recognition neural network.

18. The method of claim 17, wherein performing the step for training the weight prediction neural network comprises minimizing a font classification error loss that comprises a first weighted font classification loss for the given text image from the first font recognition neural network and a second weighted font classification loss for the given text image from the second font recognition neural network.

19. The method of claim 18, wherein:
performing the step for training the hybrid font recognition neural network further comprises providing the font classification error loss to the first font recognition neural network, the second font recognition neural network, and the weight prediction neural network;
the font classification error loss is provided to the first font recognition neural network and the second font recognition neural network at a small learning rate; and
the font classification error loss is provided to the weight prediction neural network at a large learning rate.

20. The method of claim 17, further comprising:
receiving an input text image of text comprising an input digital font;
identifying the input digital font from a plurality of known digital fonts using the hybrid font recognition neural network; and
presenting the identified input digital font.

* * * * *